United States Patent
Ji et al.

(10) Patent No.: US 8,693,405 B2
(45) Date of Patent: Apr. 8, 2014

(54) SDMA RESOURCE MANAGEMENT

(75) Inventors: Tingfang Ji, San Diego, CA (US); Dhananjay Ashok Gore, San Diego, CA (US); Alexei Gorokhov, San Diego, CA (US); Min Dong, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1544 days.

(21) Appl. No.: 11/261,837

(22) Filed: Oct. 27, 2005

(65) Prior Publication Data

US 2007/0097910 A1    May 3, 2007

(51) Int. Cl.
    *H04B 7/00*    (2006.01)

(52) U.S. Cl.
    USPC ........... 370/329; 370/328; 370/330; 370/389; 370/491; 370/203

(58) Field of Classification Search
    USPC .......... 370/329, 343, 437, 328; 375/299, 132; 709/236, 244
    See application file for complete search history.

(56) References Cited

U.S. PATENT DOCUMENTS

| | | | |
|---|---|---|---|
| 4,393,276 A | 7/1983 | Steele et al. | |
| 4,554,668 A | 11/1985 | Deman et al. | |
| 4,747,137 A | 5/1988 | Matsunaga | |
| 4,783,779 A | 11/1988 | Takahata et al. | |
| 4,783,780 A | 11/1988 | Alexis | |
| 4,975,952 A | 12/1990 | Mabey et al. | |
| 5,008,900 A | 4/1991 | Critchlow et al. | |
| 5,115,248 A | 5/1992 | Roederer et al. | |
| 5,268,694 A | 12/1993 | Jan et al. | |
| 5,282,222 A | 1/1994 | Fattouche et al. | |
| 5,363,408 A | 11/1994 | Paik et al. | |

(Continued)

FOREIGN PATENT DOCUMENTS

| | | |
|---|---|---|
| AU | 2005319084 | 4/2010 |
| CA | 2348137 | 11/2001 |

(Continued)

OTHER PUBLICATIONS

Fuchs et al., "A novel Tree-based scheduling algorithm for the downlink of multi-user MIMO systems with ZF Beamforming," Acoustics, Speech, and Signal Processing, 2005, Proceedings IEEE International Conference on Philadelphia, Pennsylvania, pp. 1121-1124, Piscataway, New Jersey.

(Continued)

*Primary Examiner* — Kiet Doan
*Assistant Examiner* — Michael T. Vu
(74) *Attorney, Agent, or Firm* — Donald C. Kordich

(57) ABSTRACT

A method for allocating resources in a wireless communications environment comprises receiving a mapping between a first hop-port and frequency range, and determining whether to map a second access terminal to a second hop-port that is mapped to at least the same frequency range during a substantially similar instance in time, the determination made as a function of characteristics relating to a first access terminal associated with the first hop-port. The method can further include determining that the first access terminal is a candidate for employing Space-Division Multiple Access (SDMA), and mapping the second-hop port and associating the second access terminal with the second hop-port when the second access terminal is also a candidate for employing SDMA.

33 Claims, 14 Drawing Sheets

(56) References Cited

U.S. PATENT DOCUMENTS

| | | |
|---|---|---|
| 5,371,761 A | 12/1994 | Daffara et al. |
| 5,384,810 A | 1/1995 | Amrany et al. |
| 5,406,551 A | 4/1995 | Saito et al. |
| 5,410,538 A | 4/1995 | Roche et al. |
| 5,455,839 A | 10/1995 | Eyuboglu et al. |
| 5,465,253 A | 11/1995 | Rahnema |
| 5,491,727 A | 2/1996 | Petit et al. |
| 5,513,379 A | 4/1996 | Benveniste et al. |
| 5,539,748 A | 7/1996 | Raith et al. |
| 5,548,582 A | 8/1996 | Brajal et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousenn et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang et al. |
| 5,838,268 A | 11/1998 | Frenkel et al. |
| 5,867,478 A | 2/1999 | Baum et al. |
| 5,870,393 A | 2/1999 | Yano et al. |
| 5,887,023 A | 3/1999 | Mabuchi et al. |
| 5,907,585 A | 5/1999 | Suzuki et al. |
| 5,920,571 A | 7/1999 | Houck et al. |
| 5,926,470 A | 7/1999 | Tiedemann, Jr., et al. |
| 5,933,421 A | 8/1999 | Alamouti et al. |
| 5,949,814 A | 9/1999 | Odenwalder et al. |
| 5,953,325 A | 9/1999 | Willars et al. |
| 5,955,992 A | 9/1999 | Shattil et al. |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley et al. |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dent et al. |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee et al. |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia et al. |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba et al. |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous et al. |
| 6,654,339 B1 | 11/2003 | Böhnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 | 1/2004 | Gray et al. |
| 6,678,318 B1 | 1/2004 | Lai et al. |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan et al. |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |

(56) References Cited

U.S. PATENT DOCUMENTS

| | | |
|---|---|---|
| 6,850,509 B2 | 2/2005 | Lee et al. |
| 6,862,271 B2 | 3/2005 | Medvedev et al. |
| 6,870,808 B1 * | 3/2005 | Liu et al. .................. 370/203 |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al. |
| 6,934,266 B2 | 8/2005 | Dulin et al. |
| 6,934,275 B1 | 8/2005 | Love et al. |
| 6,934,340 B1 | 8/2005 | Dollard et al. |
| 6,940,842 B2 | 9/2005 | Proctor, Jr. |
| 6,940,845 B2 | 9/2005 | Benveniste et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,023,880 B2 | 4/2006 | El-Maleh et al. |
| 7,039,356 B2 | 5/2006 | Nguyen et al. |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,054,301 B1 * | 5/2006 | Sousa et al. .................. 370/343 |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun et al. |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius et al. |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi et al. |
| 7,209,712 B2 | 4/2007 | Holtzman et al. |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal et al. |
| 7,257,167 B2 | 8/2007 | Lau |
| 7,257,406 B2 | 8/2007 | Ji et al. |
| 7,257,423 B2 | 8/2007 | Iochi et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer et al. |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 * | 4/2008 | Chen et al. .................. 375/132 |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil et al. |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |

(56) References Cited

U.S. PATENT DOCUMENTS

| | | |
|---|---|---|
| 7,443,835 B2 | 10/2008 | Lakshmi Narayanan et al. |
| 7,447,270 B1 | 11/2008 | Hottinen et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,768,979 B2 | 8/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,095,141 B2 | 1/2012 | Teague |
| 8,098,568 B2 | 1/2012 | Laroia et al. |
| 8,098,569 B2 | 1/2012 | Laroia et al. |
| 8,462,859 B2 | 6/2013 | Sampath et al. |
| 8,582,509 B2 | 11/2013 | Khandekar et al. |
| 8,582,548 B2 | 11/2013 | Gore et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1* | 11/2001 | Alastalo et al. ............. 709/236 |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160769 A1 | 10/2002 | Gray et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1* | 7/2003 | Schein et al. ............. 370/337 |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1* | 8/2003 | Dulin et al. ............. 370/328 |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1* | 5/2004 | Clemmensen ............. 709/244 |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |

(56) References Cited

U.S. PATENT DOCUMENTS

| | | |
|---|---|---|
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179506 A1 | 9/2004 | Padovani et al. |
| 2004/0179627 A1 | 9/2004 | Ketchum et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii et al. |
| 2005/0085195 A1 | 4/2005 | Tong et al. |
| 2005/0085197 A1 | 4/2005 | Laroia et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1* | 3/2006 | Hottinen et al. ............ 370/328 |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0092054 A1 | 5/2006 | Li et al. |
| 2006/0093065 A1* | 5/2006 | Thomas et al. ............ 375/299 |
| 2006/0104333 A1 | 5/2006 | Rainbolt et al. |
| 2006/0104381 A1 | 5/2006 | Menon et al. |
| 2006/0109814 A1* | 5/2006 | Kuzminskiy et al. ......... 370/329 |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146867 A1 | 7/2006 | Lee et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0193294 A1 | 8/2006 | Jorswieck et al. |
| 2006/0203708 A1 | 9/2006 | Sampath et al. |

(56) References Cited

U.S. PATENT DOCUMENTS

| | | |
|---|---|---|
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki et al. |
| 2006/0233131 A1 | 10/2006 | Gore et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulsonn et al. |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang et al. |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovicc et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhangg et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Hoo et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0180459 A1 | 7/2009 | Orlikk et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerterr et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | GORE; Dhananjay Ashok et al. |
| 2013/0315200 A1 | 11/2013 | Gorokhov et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 19931400 | 12/1994 |
| CL | 009531997 | 1/1998 |
| CL | 19997846 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 29032006 | 5/2007 |
| CL | 29042006 | 6/2007 |
| CL | 29022006 | 7/2007 |
| CL | 29082006 | 10/2007 |
| CL | 46151 | 12/2009 |
| CL | 29012006 | 1/2010 |
| CL | 29072006 | 1/2010 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |

(56) References Cited

FOREIGN PATENT DOCUMENTS

| | | |
|---|---|---|
| CN | 1525678 | 9/2004 |
| CN | 1636346 | 7/2005 |
| CN | 1642051 A | 7/2005 |
| CN | 1642335 A | 7/2005 |
| CN | 1647436 A | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 A1 | 6/2004 |
| EP | 0488976 A2 | 6/1992 |
| EP | 0568291 A2 | 11/1993 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1180907 A2 | 2/2002 |
| EP | 1187506 A1 | 3/2002 |
| EP | 1204217 A1 | 5/2002 |
| EP | 1255369 A1 | 11/2002 |
| EP | 1267513 A2 | 12/2002 |
| EP | 1074099 B1 | 2/2003 |
| EP | 1286490 A2 | 2/2003 |
| EP | 1335504 A2 | 8/2003 |
| EP | 1376920 A1 | 1/2004 |
| EP | 1392073 A1 | 2/2004 |
| EP | 1434365 | 6/2004 |
| EP | 1441469 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 | 3/2005 |
| EP | 1531575 A2 | 5/2005 |
| EP | 1533950 A1 | 5/2005 |
| EP | 1538863 A1 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 A1 | 1/1987 |
| GB | 2279540 A | 1/1995 |
| GB | 2348776 A | 10/2000 |
| GB | 2412541 A | 9/2005 |
| IL | 167573 | 2/2011 |
| IL | 201872 | 5/2012 |
| JP | H04111544 A | 4/1992 |
| JP | 4301931 | 10/1992 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 1997182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 A | 5/2000 |
| JP | 2000184425 | 6/2000 |
| JP | 2000511750 A | 9/2000 |
| JP | 2000332724 A | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 | 3/2004 |
| JP | 2004096142 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004534456 | 11/2004 |
| JP | 2004535106 | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005130491 A | 5/2005 |
| JP | 2005197772 | 7/2005 |
| JP | 2005203961 | 7/2005 |
| JP | 2005521327 | 7/2005 |
| JP | 2005521358 | 7/2005 |
| JP | 2006505172 | 2/2006 |
| JP | 2006506860 A | 2/2006 |
| JP | 2007503790 | 2/2007 |
| JP | 2007519281 | 7/2007 |
| JP | 2007520309 A | 7/2007 |
| JP | 2007525043 T | 8/2007 |
| JP | 2007527127 | 9/2007 |
| JP | 2008505587 A | 2/2008 |
| JP | 2006211537 | 8/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |

(56) References Cited

FOREIGN PATENT DOCUMENTS

| | | |
|---|---|---|
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2192094 C1 | 10/2002 |
| RU | 2162275 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 | 8/2004 |
| RU | 2237379 C2 | 9/2004 |
| RU | 2238611 C1 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 B | 11/2002 |
| TW | 510132 | 11/2002 |
| TW | 200302642 | 8/2003 |
| TW | 200718128 | 8/2003 |
| TW | 200401572 | 1/2004 |
| TW | 1232040 | 5/2005 |
| TW | 248266 | 1/2006 |
| WO | WO9408432 A1 | 4/1994 |
| WO | WO-9521494 A1 | 8/1995 |
| WO | WO9613920 A1 | 5/1996 |
| WO | WO9701256 | 1/1997 |
| WO | WO9737456 A2 | 10/1997 |
| WO | WO-9746033 A2 | 12/1997 |
| WO | WO-9800946 A2 | 1/1998 |
| WO | WO-9814026 A1 | 4/1998 |
| WO | WO9837706 A2 | 8/1998 |
| WO | WO 9848581 A1 | 10/1998 |
| WO | WO9853561 | 11/1998 |
| WO | WO9854919 A2 | 12/1998 |
| WO | WO-9941871 A1 | 8/1999 |
| WO | WO-9944313 A1 | 9/1999 |
| WO | WO-9944383 A1 | 9/1999 |
| WO | WO-9952250 A1 | 10/1999 |
| WO | WO9953713 | 10/1999 |
| WO | 9960729 | 11/1999 |
| WO | WO-9959265 A1 | 11/1999 |
| WO | WO00002397 | 1/2000 |
| WO | WO0033503 | 6/2000 |
| WO | WO2007000897 | 11/2000 |
| WO | WO01001596 | 1/2001 |
| WO | WO0117125 A1 | 3/2001 |
| WO | WO0126269 | 4/2001 |
| WO | WO-0139523 A2 | 5/2001 |
| WO | WO01045300 | 6/2001 |
| WO | WO-0148969 A2 | 7/2001 |
| WO | WO-0158054 A1 | 8/2001 |
| WO | WO-0160106 A1 | 8/2001 |
| WO | WO-0165637 A2 | 9/2001 |
| WO | WO0169814 A1 | 9/2001 |
| WO | WO0182543 A2 | 11/2001 |
| WO | WO-0182544 A2 | 11/2001 |
| WO | WO-0189112 A1 | 11/2001 |
| WO | WO0193505 | 12/2001 |
| WO | WO-0204936 A1 | 1/2002 |
| WO | WO02007375 | 1/2002 |
| WO | WO0215616 | 2/2002 |
| WO | WO-0219746 A1 | 3/2002 |
| WO | 02/33848 A2 | 4/2002 |
| WO | WO-0231991 A2 | 4/2002 |
| WO | WO-0245293 A2 | 6/2002 |
| WO | WO0245456 A1 | 6/2002 |
| WO | WO-0249306 A2 | 6/2002 |
| WO | WO0249385 A2 | 6/2002 |
| WO | WO02049305 A2 | 6/2002 |
| WO | WO02060138 A2 | 8/2002 |
| WO | WO02065675 | 8/2002 |
| WO | WO02082689 A2 | 10/2002 |
| WO | WO-02082743 A2 | 10/2002 |
| WO | WO02089434 A1 | 11/2002 |
| WO | WO02093782 A1 | 11/2002 |
| WO | WO02093819 | 11/2002 |
| WO | WO02100027 A1 | 12/2002 |
| WO | WO03001696 A2 | 1/2003 |
| WO | WO-03001696 A2 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | 03058871 | 7/2003 |
| WO | WO03067783 | 8/2003 |
| WO | WO-03069816 A2 | 8/2003 |
| WO | WO03069832 A1 | 8/2003 |
| WO | WO03073646 | 9/2003 |
| WO | WO03075479 A1 | 9/2003 |
| WO | 03088538 A1 | 10/2003 |
| WO | WO03085876 | 10/2003 |
| WO | WO03094384 | 11/2003 |
| WO | WO03103331 | 12/2003 |
| WO | WO04002047 A1 | 12/2003 |
| WO | WO2004004370 | 1/2004 |
| WO | WO-2004008681 A1 | 1/2004 |
| WO | WO20044008671 | 1/2004 |
| WO | WO04016007 | 2/2004 |
| WO | WO2004015912 | 2/2004 |
| WO | WO2004021605 A1 | 3/2004 |
| WO | WO2004023834 A1 | 3/2004 |
| WO | WO-2004028037 A1 | 4/2004 |
| WO | WO-2004030238 A1 | 4/2004 |
| WO | WO-2004032443 A1 | 4/2004 |
| WO | WO04038954 | 5/2004 |
| WO | WO-2004035988 A2 | 5/2004 |
| WO | WO-2004038972 A1 | 5/2004 |
| WO | WO-2004040690 A2 | 5/2004 |
| WO | WO-2004040827 A2 | 5/2004 |
| WO | WO2004047354 A1 | 6/2004 |
| WO | WO2004049618 A1 | 6/2004 |
| WO | WO-2004051872 A2 | 6/2004 |
| WO | WO-2004056022 A1 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO-2004073276 A1 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |

(56) References Cited

FOREIGN PATENT DOCUMENTS

| | | |
|---|---|---|
| WO | WO2004084509 | 9/2004 |
| WO | WO-2004086706 A1 | 10/2004 |
| WO | WO-2004086711 A1 | 10/2004 |
| WO | WO2004095730 A1 | 11/2004 |
| WO | WO-2004095851 A2 | 11/2004 |
| WO | WO2004095854 | 11/2004 |
| WO | WO-2004098072 A2 | 11/2004 |
| WO | WO2004098222 | 11/2004 |
| WO | WO2004102815 | 11/2004 |
| WO | WO2004102816 A2 | 11/2004 |
| WO | WO2005015810 | 11/2004 |
| WO | 2004105272 A1 | 12/2004 |
| WO | 2004114564 A1 | 12/2004 |
| WO | WO2004114549 | 12/2004 |
| WO | 2005002253 | 1/2005 |
| WO | 2005011163 A1 | 2/2005 |
| WO | 2005018270 | 2/2005 |
| WO | WO-2005015795 A1 | 2/2005 |
| WO | WO-2005015797 A1 | 2/2005 |
| WO | WO-2005015941 A2 | 2/2005 |
| WO | WO2005020488 A1 | 3/2005 |
| WO | WO2005020490 | 3/2005 |
| WO | WO2005022811 | 3/2005 |
| WO | WO2005025110 A2 | 3/2005 |
| WO | 2005032004 A1 | 4/2005 |
| WO | WO2005043855 | 5/2005 |
| WO | WO2005046080 | 5/2005 |
| WO | WO2005055484 A1 | 6/2005 |
| WO | WO-2005055527 A1 | 6/2005 |
| WO | WO2005060192 | 6/2005 |
| WO | WO-2005065062 A2 | 7/2005 |
| WO | WO-2005069538 A1 | 7/2005 |
| WO | WO2005074184 | 8/2005 |
| WO | WO-2005096538 A2 | 10/2005 |
| WO | WO2005122628 | 12/2005 |
| WO | 2006007292 A2 | 1/2006 |
| WO | WO2006019710 | 2/2006 |
| WO | WO-2006026344 A1 | 3/2006 |
| WO | WO2006044487 | 4/2006 |
| WO | 2006069301 | 6/2006 |
| WO | WO-2006062356 A1 | 6/2006 |
| WO | WO2006069300 | 6/2006 |
| WO | WO2006069397 | 6/2006 |
| WO | WO2006077696 | 7/2006 |
| WO | WO-2006096784 A1 | 9/2006 |
| WO | WO-2006099349 A1 | 9/2006 |
| WO | WO-2006099545 A1 | 9/2006 |
| WO | WO-2006099577 A1 | 9/2006 |
| WO | WO-2006127544 A2 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | WO-2007022430 A2 | 2/2007 |
| WO | WO-2007024934 A2 | 3/2007 |
| WO | WO-2007024935 A2 | 3/2007 |
| WO | WO2007025160 | 3/2007 |
| WO | WO-2007051159 A2 | 5/2007 |

OTHER PUBLICATIONS

International Search Report, PCT/US06/060327, International Search Authority, European Patent Office, Mar. 1, 2007.

Written Opinion, PCT/US06/060327, International Search Authority, European Patent Office, Mar. 2, 2007.

International Preliminary Report on Patentability, PCT/US06/060327, International Bureau of WIPO, Apr. 29, 2008.

Wang, et al., "Improving performance of multi-user OFDM systems using bit-wise interleaver" Electronics Letters, IEE Stevenage, GB, vol. 37, No. 19, Sep. 13, 2001, pp. 1173-1174, XP006017222.

Yun, et al., "Performance of an LDPC-Coded Frequency-Hopping OFDMA System Based on Resource Allocation in the Uplink" Vehicular Technology Conference, 2004, VTC 2004-Spring. 2004 IEEE 59th Milan, Italy, May 17-19, 2004, Piscataway, NJ, USA, vol. 4, May 17, 2004, pp. 1925-1928, XP010766497.

3rd Generation Partnership Project; Technical Specification Group Radio Access Network: Physical Layer Aspects for Evolved UTRA (Release 7). 3GPP TR 25.814 v0.3.1 (Nov. 2005).

B. Sklar: "The process of thus correcting the channel-induced distortion is called equalization", Digital Communications; PTR Prentice Hall Upper Saddle River, New Jersey, 1998. Formatting and Baseband Transmission, Chap. 2, Section 2.11.2, pp, 104-105.

Bahai, Saltzberg: "System Architecture," Multi-Carrier Digital Communications, Kluwer Academic, New York, NY, XP-002199501, 1999, pp. 17-21.

Bingham: "Other Types of MCM," ADSL, VDSL, and Multicarrier Modulation, John wiley & Sons, New York, XP-002199502, 2000, pp, 111-113.

Carl R Nassar, Balasubramaniam Natarajan and Steve Shattil: Introduction of Carrier Interference to Spread Spectrum Multiple Access, Apr. 1999, IEEE, pp. 1-5.

Chennakeshu, et al. "A Comparison of Diversity Schemes for a Mixed-Mode Slow Frequency-Hopped Cellular System" IEEE, 1993, pp. 1749-1753.

Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.

Chiani, et al, "Outage Evaluation for Slow Frequency-Hopping Mobile Radio Systems" IEEE Transactions on Communications, vol. 47, No. 12, pp. 1865-1874, Dec. 1999.

Choi, et al., "Design of the Optimum Pilot Pattern for Channel Estimation in OFDM Systems," Global Telecommunications Conference, IEEE Communications Society, Globecom, Dallas, Texas (2004), pp. 3661-3665.

Czylwik: "Comparison Between Adaptive OFDM and Single Carrier Modulation with Frequency Domain Equalization," IEEE 47th Vehicular Technology Conference, vol. 2, May 4-7, 1997, pp. 865-869.

Das, Arnab, et al "Adaptive, asynchronous incremental redundancy (A-IR) with fixed transmission time intervals TTI for HSDPA," IEEE, pp. 10-83-1087.

Das, et al. "On the Reverse Link Interference Structure for Next Generation Cellular Systems," European Microwave Conference. Oct. 11, 2004, pp. 3068-3072.

Digital cellular telecommunications system (Phase 2+); mobile radio interface layer 3 specification (GSM 04.08 version 7.7.1 Release 1998); ETSI EN 300 940 V7 7 1 (Oct. 2000), pp. 1,2,91-93.

Dinis, et al., "A Multiple Access Scheme for the Uplink of Broadband Wireless Systems," IEEE Global Telecommunications Conference, 2004, Globecom '04, vol. 6, Nov. 29-Dec. 3, 2004, pp. 3808-3812.

Favre et al: "Self-Adaptive Transmission Procedure" IBM Technical Disclosure Bulletin, IBM Corporation, Sep. 1976, vol. 19, No. 4, pp. 1283-1284, New York, New York.

Groe, et al., "CDMA Mobile Radio Design," Sep. 26, 2001 Artech House, Norwood, MA 02062, pp. 257-259.

Hermann Rohling et al., "Performance Comparison of Different Multiple Access Schemes for the Downlink of an OFDM Communication System", Vehicular Technology Conference, 1997, 47th IEEE, vol. 3, May 4-7, 1997, pp. 1365-1369.

Hill, et al., "Cyclic Shifting and Time Inversion of Partial Transmit Sequences to Reduce the Peak-to-Average Power Ratio in OFDM," IEEE International Symposium on Personal, Indoor and Mobile Radio Commnications, vol. 2, Sep. 18, 2000, Piscataway, NJ, pp. 1256-1259.

J.S. Chow and J.M. Cioffi, "A Cost-effective maximum likelihood reciever for multicarrier systems", Proc. IEEE Int. Conf. on Comm., pp. 948-952, Jun. 1992.

Je, et al. "A Novel Multiple Access Scheme for Uplink Cellular Systems," IEEE Vehicular Technology Conference, Sep. 26, 2004 pp. 984-988.

John B. Groe, Lawrence E. Larson, "CDMA Mobile Radio Design" Sep. 26, 2001, Artech House, Norwood, MA02062 580530, XP002397967, pp. 157-159.

Kaleh: "Channel Equalization for Block transmission Systems," IEEE Journal on Selected Areas in Communications, vol. 13, No. 1, Jan. 1995, pp. 110-121.

(56) References Cited

OTHER PUBLICATIONS

Kappes, J.M., and Sayegh, S.1., "Programmable Demultiplexer/Demodulator Processor,"COMSAT Laboratories, IEEE, 1990, pp. 230-234.

Karsten Bruninghaus et al., "Multi-Carrier Spread Spectrum and it's relationship to Single-Carrier Transmission", Vehicular technology Conference, 1998, VTC 98, 48th IEEE, vol. 3, May 18-21, 1998, pp. 2829-2332.

Keller, et al.; "Adaptive Multicarrier Modulation; A Convenient Framework for Time-Frequency Processing in Wireless Communications," Proceedings of the IEEE, vol. 88, No. 5, May 2000, pp. 611-640.

Kim, et al. "Performance of TDMA System With SFH and 2-Bit Differentially Detected GMSK Over Rayleigh Fading Channel," IEEE Vehicular Technology Conference. Apr. 28, 1996, pp. 789-793.

Kishiyama Y et al. "Investigation of Optimum Pilot Channel Structure for VSF-OFCDM Broadband Wireless Access in Forward Link", IEEE Vehicular Technology Conference, New York, NY, US, vol. 4, Apr. 22, 2003, p. 139-144.

Kostic, et al. "Dynamic Frequency Hopping in Wireless Cellular Systems-Simulations of Full-Replacement and Reduced-Overhead Methods." IEEE Vehicular Technology Conference, May 16, 1999, pp. 914-918.

Kostic, et al, "Fundamentals of Dynamic Frequency Hopping in Cellular Systems," IEEE Journal on Selected Areas in Communications, vol. 19, No. 11, Nov. 2001, pp. 2254-2266.

Lacroix. et al.; "A Study of OFDM Parameters for High Data Rate Radio LAN's," 2000 IEEE 51st Vehicular Technology Conference Proceedings, vol. 2, May 15-18, 2000, pp. 1075-1079.

Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.

Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.

Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.

Lettieri et al: "Adaptive frame length control for improving wireless link throughput, range, and energy efficiency" INFOCOM 98, 17th Annual Joint Conference of the IEEE Computer and Communications Societies, Mar. 29-Apr. 2, 1998, pp. 564-571, vol. 2, IEEE San Francisco, CA, New York, New York.

Lott: "Comparison of Frequency and Time Domain Differential Modulation in an OFDM System for Wireless ATM," 1999 IEEE 49th Vehicular Technology Conference, vol. 2, Jul. 1999, pp. 877-883.

Mignone, et al.: "CD3-OFDM: A New Channel Estimation Method to Improve the Spectrum Efficiency in Digital Terrestrial Television Systems." International Broadcasting Convention, Sep. 14-18, 1995 Conference Publication No. 413, IEE 1995, pp.122-128.

Molisch, et al., MIMO systems with antenna selection, IEEE Microwave Magazine, URL: http://ieeexplore.ieee.org/iel5/6668/28677/01284943.pdf, Retrieved on Dec. 8, 2006, pp. 46-56 (2004).

Naofal Al-Dhahir: "A Bandwidth-Optimized Reduced-Complexity Equalized Multicarrier Transceiver", IEEE Transactions on Communications, vol. 45, No. 8, Aug. 1997.

Naofal Al-Dhahir: "Optimum Finite-Length Equalization for Multicarrier Transceivers", IEEE Trans. on Comm., pp. 56-64, Jan. 1996.

Nassar, Carl R., et al., "High-Performance MC-CDMA via Carrier Interferometry Codes", IEEE Transactions on Vehicular Technology, vol. 50, No. 6, Nov. 2001.

Ntt DoCoMo, et al,. "Orthogonal Common Pilot Channel and Scrambling Code in Evolved UTRA Downlink," 3GPP TSG RAN WG1 #42 on LTE, pp. 1-8 (Aug.-Sep. 2005).

Sari, et al., "Transmission Techniques for Digital Terrestrial TV Broadcasting," IEEE Communications Magazine, Feb. 1995, pp. 100-109.

Schnell, et al., "Application of IFDMA to Mobile Radio Transmission," IEEE 1998 International Conference on Universal Personal Communications, vol. 2, Oct. 5-9, 1998, pp. 1267-1272.

Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.

Shattil et al., "Array Control Systems for Multicarrier Protocols Using a Frequency-Shifted Feedback Cavity", IEEE, 1999.

Sklar: "Formatting and Baseband Transmission", Chapter 2, pp. 54, 104-106.

Sorger U. et al., "Interleave FDMA-a new spread-spectrum multiple-access scheme", IEEE Int. Conference on Atlanta, GA; USA Jun. 7-11, 1996 XP010284733.

Tellado, "Multicarrier Modulation with Low Par," Kluwer Academic, Dordrecht, NL, XP-002199500, 2000, pp. 6-11 and 55-60.

Tellambura, "Use of m-sequences for OFDM Peak-to-Average Power Ratio Reduction," Electronics Letters, vol. 33, No. 15, Jul. 17, 1997, pp. 1300-1301.

TIA/EIA/IS-2000 "Standards for CDMA2000 Spread Spectrum Systems" Version 1.0 Jul. 1999.

TIA/EIA/IS-95 "Mobile Station-Base Station Compatibility Standard for Dual-Mode Wideband Spread Spectrum Cellular System" Jul. 1993.

TIA-1121.001 "Physical Layer for Ultra Mobile Broadband (UMB) Air interface Specification," 3GPP2 C.-S0084-001-0, Version 2.0 (Aug. 2007).

TIA-1121.002 "Medium Access Control Layer for Ultra Mobile Broadband (UMB) Air Interface Specification," 3GPP2 C, S0084-002-0, Version 2.0 (Aug. 2007).

Tomcik, J.: "MBFDD and MBTDD Wideband Mode: Technology Overview," IEEE 802.20 Working Group Mobile Broadband Wireless Access, Jan. 2006, pp. 1-109, XP002429968.

Tomcik, J.: "QFDD Technology Overview Presentation," IEEE 802.20 Working Group on Mobile Broadband Wireless Access, Slides/pp. 1-73, Nov. 15, 2005 and Oct. 28, 2005.

Torrieri, "Cellular Frequency-Hopping CDMA Systems," IEEE Vehicular Technology Conference, May 16, 1999, pp. 919-925.

Toufik I et al., "Channel allocation algorithms for multi-carrier systems", Vehicular Technology Conference, 2004. VTC2004-Fall. 2004 IEEE 60TH Los Angeles, CA, USA Sep. 26-29, 2004, pp. 1129-1133, XP010786798, ISBN: 07-7803-8521-7.

Xiaodong, et al., "M-Sequences for OFDM Peak-to-Average Power Ratio Reduction and Error Correction;" Electronics Letters, vol. 33, Issue 7, Mar. 27, 1997, pp. 554-555.

Zekri, et al., "DMT Signals with Low Peak-to-Average Power Ratio," Proceedings, IEEE International Symposium on Computers and Communications, Jul. 6-8, 1999, pp. 362-368.

B. Sklar: "The process of the correcting the channel-induced disortion is called equalization", Digital Communications, PTR Prentice Hall, Upper Saddle River, New Jersey, 1998, Formatting and Baseband Transmission, Chap. 2, Section 2.11.2, pp. 104-106.

"European Search Report—EP10011743, Search Authority—Munich Patent Office, Dec. 20, 2010".

European Search Report—EP10012081, Search Authority—Munich Patent Office, Dec. 17, 2010.

European Search Report—EP10012082, Search Authority—Munich Patent Office, Dec. 20, 2010.

European Search Report—EP10012083, Search Authority—Munich Patent Office, Dec. 30, 2010.

Guo, K. Et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10,1117/12.514061.

Maniatis, I. at al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.

(56) References Cited

OTHER PUBLICATIONS

Sumii, Kenji, at al., "A Study on Computational Complexity Reduction of Iterative Decoding for Turbo-coded MIMO-SDM Using Sphere Decoding," Technical Report of IEICE RCS, Nov. 9, 2010, vol. 104, No. 675, pp. 43-48.
Taiwan Search Report—TW094123763—TIPO—Aug. 8, 2011.
Taiwan Search Report—TWO95129021—Tipo—May. 24, 2011.
Taiwan Search Report—TW095130842—Tipo—Jun. 18, 2011.
Taiwan Search Report—TW096146164—Tipo—Jun. 1, 2011.
Taiwanese Search Report—095139893—Tipo—Dec. 30, 2010.
Tomcik, T.: "QTDD Performance Report 2," IEEE C802.20-05/88, IEEE 802.20 Working Group on Mobile Broadband Wireless Access, <http://ieee802.org1201>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP09008725 dated Mar. 8, 2011.
Translation of Office Action in Korean application 10-2007-7031029 corresponding to U.S. Appl. No. 11/260,931, citing US20030202491 and KR20040063057 datedJan. 28, 2011.
Translation of Office Action in Canadian application 2625987 corresponding to U.S. Appl. No. 11/261,065, citing CA2557369 dated Apr. 12, 2011.
Translation of Office Action in Chinese application 200680040236,1 corresponding to U.S. Appl. No. 11/261,065, citing US20040048609 and CN1402916 dated Feb. 18, 2011.
Translation of Office Action in Chinese application 200680048265.2 corresponding to U.S. Appl. No 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924. citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261.159, citing GB2348776 , WO2004098222, WO2005065062 and WO2004102815. Dated Jan. 11, 2011.
Translation of Office Action in Japanese application 2008-538181 corresponding to U.S. Appl. No. 11/511,735, citing W004064295, JP2002515203, JP8288927, JP7336323 and 0 JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782. (Nov. 1, 2003).
Yongrnei Dai,; Sumei Sun; Zhongding Lei; Yuan Li: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109VETECS.2004. 1388940.
3GPP TS 33.220 V.1.1.0 XX,XX, "3rd Generation Partnership Project; T Technical Specification Group Services and System Aspects; Generic Authentication Architecture (GAA); Generic Bootstrapping Architecture RELEASE 6)" February 9, 2004, pp. 1-17, figure 4, XP002996023.
Blum et al, "On Optimum MIMO with antenna selection," IEEE International Conference on Communications. Conference Proceedings, vol. 1, Apr. 28. 2002, pp. 386-390.
Chiani, et al. "Outage Evaluation for Slow Frequency-Hopping Mobile Radio Systems" IEEE Transactions on Communications, vol. 47, No. 12, Dec. 1999, pp. 1865-1874 .

Dierks, et ai , "The TLS Protocol", Version 1.0. Network Working Group, Request for Comments 2246, pp. 1-80 (Jan. 1999).
El Gamal, et al.: "Universal Space-Time Coding," IEEE Transactions on Information Theory, vol. 49, Issue 5, pp. 1097-1119, XP011074756, ISSN: 0018-9448, May 2003.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa M A et al: "Adaptive Binary Coding for Diversity Communication Systems" IEEE International Conference on Personal Wireless Communications Proceedings, pp. 80-84, XP000992269, 1997.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Prasad N. et al: "Analysis of Decision Feedback Detection for MIMO Rayleigh Fading Channels and Optimum Allocation of Transmitter Powers and Qam Constellations." pp. 267 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3RD Generation Partnership Project (3GPP), Mobile Competence Centre ; 650, Route Des Lucioles; F-06921 Sophia-Antipolis Cedex ; France, vol. RAN WG1, No. San Diego, USA; 20051004, Oct. 4, 2005, pp. 1-10, XP050100715 retrieved on Oct. 4, 2005.
S. Catreux, P. F. Droessen, L.J. Greenstein, "Simulation results for an interference-limited multiple input multiple output cellular system"., Global Telecommrnunications Conference, 2000. Globecom '00. IEEE Dec. 1, 2000. vol, 2, pp. 1094-1096 http://ieeexplore ieee.org/ie15/7153/19260/00891306.pdf?tp=8,isnumber=192608,arnumber=8913063&punumber=7153.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
Schnell at al.. "Application of IFDMA to Mobile Radio Transmission", IEEE 1998 International Conference on Universal Personal Communications, vol. 2, 5-9 Oct 1998, pp. 1267-1272.
Seong Taek Chung et al: "Low complexity algorithm for rate and power quantization in extended V-Blast" VTC Fall 2001. IEEE 54th. Vehicular Technology Conference Proceedings. Atlantic City, NJ, Oct, 7-11,,2001, vol. 1 of 4 , pp. 910-914, Conf. 54.
Taiwanese Search report—095139900—TIPO—Apr. 29, 2010.
Widdup at al., "A highly-parallel VLSI architecture for a list sphere detector," IEEE International Conference, Paris, Fance, vol. 5, pp. 2720-2725 (2004).
Wiesel a at al.: "Efficient implementation of sphere demodulation" Signal Processing Advances in Wireless Communications, 2003. SPAWC 200 3. 4TH IEEE Workshop on Rome. Italy June 15-18, 2003, Piscataway, NJ, USA, IEEE, US, June 15, 2003, pp. 36-40, XP010713463.
Alcatel-Lucent, et al., "Dedicated Reference Signals for Precoding in E-UTRA Downlink" 3GPP Draft; R1-071718, 3RD Generation Partnership Project (3GPP), Mobile Competence Centre ; 650, Route Des Lucioles ; F-06921 Sophia-Antipolis Cedex ; France, vol. Ran WG1, No. St. Julian; 20070403, Apr. 3, 2007, XP050105640 [retrieved on Apr. 4, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, a. et al., "Beamforming in Combination with Space-Time Diversity for Broadband OFDM Systems", ICC 2002. 2002 IEEE International Conference on Communications. April 28- May 2, 2002, pp. 165-171, XP010589479.
European Search Report—EP10184156—Search Authority—Munich—Jun. 14, 2012.
Ken Murakami et al., "Status Toward Standardization at IEEE 802. 3ah and items on the construction of GE-PON system ," Technical

(56) References Cited

OTHER PUBLICATIONS

Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. Ri-050590, Jun. 20, 2005, pp. 1-24, XP003006923 the whole document.
Siemens, "Evolved UTRA uplink scheduling and frequency reuse" [online], 3GPP TSG-RAN WG1 # 41 R1-050476, Internet <Url:http://www.3gpp.org/ftp/tsg$_{13}$ ran/WG1$_{13}$ RL1/TSGR1$_{13}$ 41/Docs/R1-050476.zip>, May 9, 2005.
Viswanath, P. et al, "Opportunistic Beamforming Using Dumb Antennas" IEEE Transactions on Information Theory, IEEE Usa, vol. 48, No. 6, Jun. 2002, pp. 1277-1294, XP002314708 ISSN: 0018-9448 abstract right-hand column, paragraph 1.
Yatawatta, S. et al., "Energy Efficient Channel Estimation in MIMO Systems", 2005 IEEE International Conference on Acoustics, Speech, and Signal Processing, March 18-23, 2005, Philadelphia, vol. 4, pp. 317-320, Mar. 18, 2005.
Anonymous: "3GPP TS 36.211 V8.0.0; Evo/Yed Universal Terrestrial Radio Access (E-UTRA); Physical channels and ,modulation Release 8)" 3RD Generation Partnership Project; Technical Specification Group Radio Access Network, [Online]2007, XP002520076 Retrieved from the Internet: URL:http://www.Sgpp.org/ftp/Specs/html-i nf o/36211.htm> [retrieved on Sep. 27, 2009] Section 5.
Jim Tomcik, QFDD and QTDD: Technology Overview, IEEE 802.20 Working Group on Mobile Broadband Wireless Access, October 28, 2005, pp. 48-50. URL, http://www,IEEE802.Org/20/Contribs/C802.20-05-68.Z1P.
Miorandi D., at a1., "Analysis of master-slave protocols for reai-time industrial communications over IEEE 802,11 WLANs" Industrial Informatics, 2004. Indin '04, 2nd IEEE International Conference on Berlin, Germany June 24-25, 2004. Piscataway, NJ, USA IEEE, June 24, 2004. pp. 143-148, XP010782619, ISBN 0789385136, Para 3, point B.
Nokia; "compact signalling of multi-code allocation for HSDPA", version 2.3GPP R1-02- 0018, Jan. 11, 2002.
Sethi M, et e., "Code Reuse DS-CDMA—A Space Time Approach", Proceedings of the 3002 IEEE International Conference on Acoustics, Speech, and Signal Processing (ICASSP), pp: 2297-2300, May 13-17, 2002.
Samsung: "Uplink Transmission and Multiplexing for EUTRA", 3GPP Draft; R1-050605 UL Multiplexing: Jun. 16, 2005, XP050111420.
Bhushan N., "UHDR Overview", 030-20060522-037, Denver, CO, May 22, 2006, pp. 1-115.
Tachikawa (Editor); "W-CDMA Mobile Cornmuncation Systems", John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May, 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg$_{13}$ ran/WG1$_{13}$ R1/TSGR1/DOCS/[retrieved on Feb. 7, 2012].
Tomcik J., "QFDD and QTDD: Proposed Draft Air Interface Specification," IEEE C802.20-05/69, IEEE 802.20 Working Group on Mobile Broadband Wireless Access, Oct. 28, 2005, P.1-6,1-7,1-16,6-65,7-11,7-33,7-37-7-55,9-21,9-22,9-24-9-32.

\* cited by examiner

SDMA RESOURCE MANAGEMENT

REFERENCE TO CO-PENDING APPLICATIONS FOR PATENT

The present Application for patent is related to the following co-pending U.S. patent applications:

"A method and apparatus for bootstrapping information in a communication system" having Ser. No. 11/261,065, filed concurrently herewith, assigned to the assignee hereof, and expressly incorporated by reference herein; and "Puncturing Signaling Channel For A Wireless Communication System" having Ser. No. 11/260,931, filed concurrently herewith, assigned to the assignee hereof, and expressly incorporated by reference herein.

"Systems And Methods For Control Channel Signaling" having Ser. No. 11/261,836, filed concurrently herewith, assigned to the assignee hereof, and expressly incorporated by reference herein; and "Varied Transmission Time Intervals For Wireless Communication System" having Ser. No. 11/260,932, filed concurrently herewith, assigned to the assignee hereof, and expressly incorporated by reference herein.

"*Channel Sensitive Scheduling" having Ser. No. 11/260,924, filed concurrently herewith, assigned to the assignee hereof, and expressly incorporated by reference herein; and "Shared Signaling Channel" having Ser. No. 11/261,158, filed concurrently herewith, assigned to the assignee hereof, and expressly incorporated by reference herein.

"Virtual Antenna" having Ser. No. 11/261,823, filed concurrently herewith, assigned to the assignee hereof, and expressly incorporated by reference herein; and "Mobile Wireless Access System" having Ser. No. 11/261,832, filed concurrently herewith, assigned to the assignee hereof, and expressly incorporated by reference herein.

BACKGROUND

I. Field

The following description relates generally to wireless communications, and, amongst other things, to flexible communication schemes for wireless communications systems.

II. Background

To enable transmission of data to and from mobile devices, a robust communications network must be enabled. One particular technology utilized in today's mobile networks is Orthogonal Frequency Division Modulation or Orthogonal Frequency Division Multiplexing (OFDM). OFDM modulates digital information onto an analog carrier electromagnetic signal, and is utilized, for example, in the IEEE 802.11a/g WLAN standard. An OFDM baseband signal (e.g., a subband) constitutes a number of orthogonal subcarriers, where each subcarrier is independently modulated by its own data. Benefits of OFDM include ease of filtering noise, ability to vary upstream and downstream speeds (which can be accomplished by way of allocating more or fewer carriers for each purpose), ability to mitigate effects of frequency-selective fading, etc.

Conventional networks must also be able to adapt to new technologies to accommodate an ever-increasing number of users. Thus, it is important to increase a number of dimensions within sectors of a network without substantially affecting quality of data transmission in a negative manner. When utilizing OFDM, increasing dimensions can be problematic as there are a finite number of tones that can be utilized for data communication. Space Division Multiple Access (SDMA) enables an increase in the number of dimensions through sharing of time-frequency resources. For example, a first user and a second user can utilize a substantially similar frequency at a same instance in time in a single sector as long as they are separated by a sufficient spatial distance. Through employment of beams, SDMA can be utilized in an OFDM/OFDMA environment.

In one particular example, beamformed transmissions can be employed to enable SDMA in an OFDM/OFDMA environment. Multiple transmit antennas located at a base station can be used to form beamformed transmissions, which utilize "beams" that typically cover a narrower area than transmissions using a single transmit antenna. However, the signal to interference and noise ratio (SINR) is enhanced within the area covered by the beams. The portions of a sector not covered by a beam may be referred to as a null region. Mobile devices located within the null region will have will have an extremely low SINR, resulting in reduced performance and possible loss of data. Through use of such beams, users separated by sufficient spatial distance can communicate on substantially similar frequencies, thereby increasing a number of dimensions that can be employed within a sector. There may be instances, however, when it is not desirable for a user to employ SDMA. For example, when precoding is desired, or when channel diversity is desired, degraded performance may result with respect to some mobile devices within a particular region.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Described herein are systems, methods, apparatuses, and articles of manufacture that facilitate allocation of resources in a wireless communications environments on a forward link. A codebook can be maintained that indicates particular users or access terminals with respect to which SDMA can be employed. Based upon an analysis of the codebook, a first and second channel tree can be maintained, wherein access terminals that can employ SDMA are associated with hop-ports on disparate channel trees. This enables the disparate access terminals to share time-frequency resources. With respect to access terminals that are not candidates for employing SDMA, such access terminals can be associated with hop-ports that are assigned to the first channel tree and mapped to frequency ranges that are not mapped to hop-ports on the second channel tree.

For instance, a method for allocating resources in a wireless communications environment is described herein, wherein the method comprises receiving a mapping between a first set of hop-ports one tree and a frequency range and determining whether to assign a second access terminal to a second hop port that is mapped to at least the same frequency range during a substantially similar instance in time, the determination made as a function of characteristics relating to a first access terminal associated with the first hop-port. The method can further include determining that the first access terminal is a candidate for employing Space-Division Multiple Access (SDMA), and mapping the second-hop port to the same frequency range and mapping the second hop port and associating the second access terminal with the second hop port when the second access terminal is also a candidate for employing SDMA. A first channel tree can include multiple mappings between hop ports and frequency ranges according to a first hop permutation and a second channel tree can include multiple mappings between hop ports and the frequency ranges according to the first hop permutation. The method can additionally include determining that the first access terminal has a first spatial direction, determining that the second access terminal has second spatial direction, mapping the first access terminal to the first hop port for a first time period, and mapping the second access terminal to the second hop port for the first time period. Still further, the method can include receiving a quantized value indicative of the first direction from the first access terminal, and association the first access terminal to the first-hop hop port based upon the quantized value, wherein the quantized value can be selected from a codebook.

Moreover, a wireless communications apparatus is disclosed herein, where the apparatus comprises a memory that includes information relating to whether two access terminals are candidates for employing SDMA in an OFDM/OFDMA environment. The apparatus can further include a processor that assigns the two access terminal to the two hop ports that are mapped to substantially similar frequencies in a sector at substantially similar times if the two access terminals are candidates for employing SDMA. In one example, a first channel tree can include mappings between multiple hop ports and multiple frequency ranges according to a hop permutation, and the processor can define mappings associated with a second channel tree as a function of the hop permutation.

Furthermore, an apparatus for managing frequency resources in a wireless communications environment is described herein, where the apparatus comprises means for determining that a first access terminal and a second access terminal are candidates for employing SDMA. The apparatus can further include means for assigning the first access terminal to a first hop port and the second access terminal to the second hop-port, the first and second hop ports are mapped to substantially similar time-frequency resources. The apparatus can further include means for analyzing a first channel tree that includes the mapping between the first hop-port and the time-frequency resources as well as means for defining the mapping between the second hop-port and the time-frequency resources in a second channel tree.

Additionally, a computer-readable medium is disclosed herein, where such medium includes instructions for determining that a first access terminal is a candidate for employing SDMA, assigning the first access terminal to one or more hop-ports that are mapped to one or more frequency tones in a first channel tree, determining that a second access terminal is a candidate for employing SDMA, assigning the second access terminal to one or more hop-ports, and mapping the one or more hop-ports assigned to the second access terminal to the one or more frequency tones mapped to the one or more hop-ports assigned to the first access terminal in a second channel tree.

Further, a processor is disclosed and described herein, wherein the processor executes instructions for enhancing performance for a wireless communication environment, the instructions comprise associating a first access terminal to a first set of hop-ports, the first access terminal configured to operate in an OFDM/OFDMA environment, the first access terminal is a candidate for employment of SDMA, mapping the first set of hop-ports to a range of frequencies, associating a second access terminal to a second set of hop-ports, the second access terminal configured to operate in an OFDM/OFDMA environment, the second access terminal is a candidate for employment of SDMA, and mapping the second set of hop-ports to the range of frequencies so that the first set of hop-ports and the second set of hop-ports are mapped to the range of frequencies at a substantially similar time.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
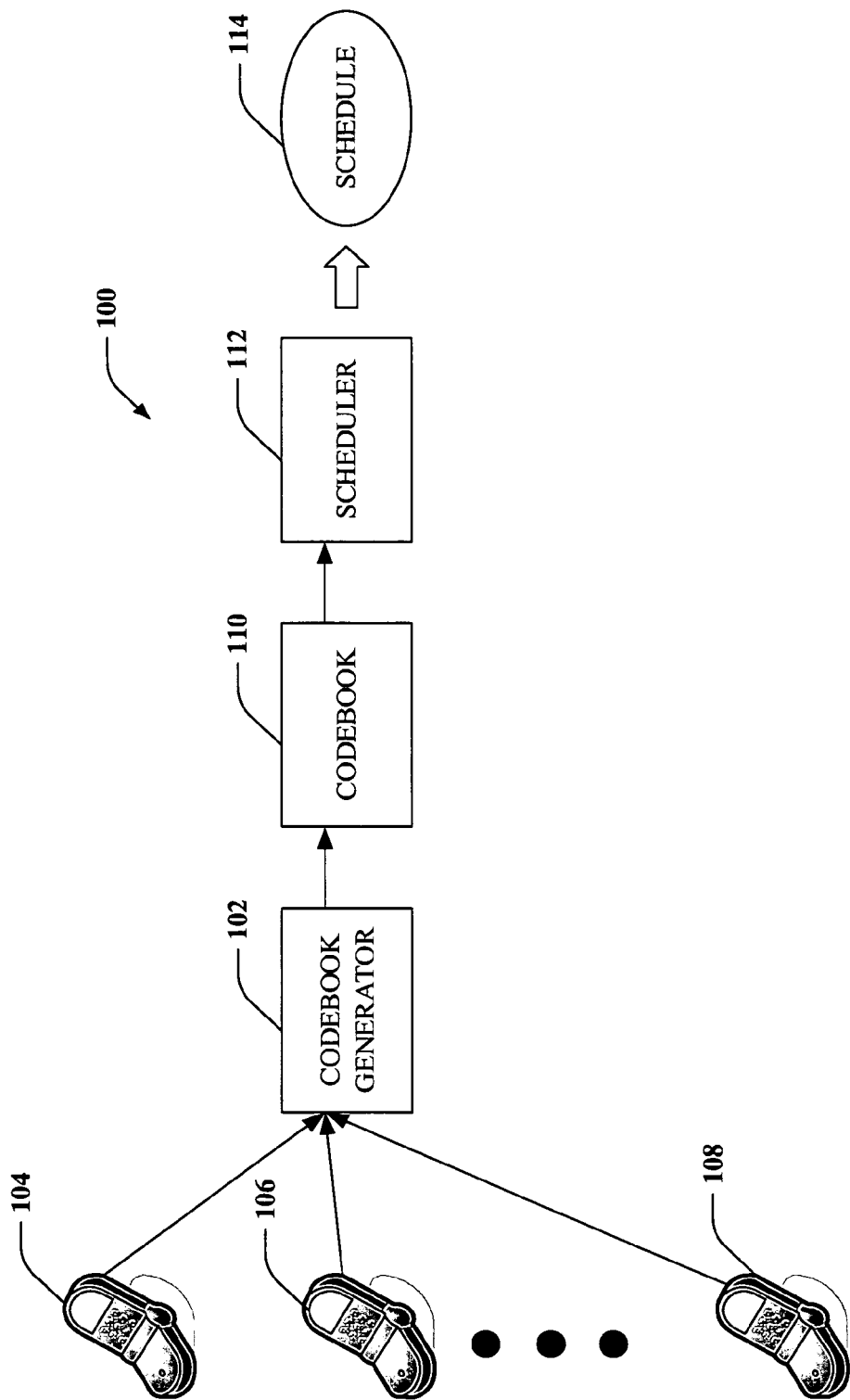
FIG. 1 is a high-level block diagram of a system that facilitates allocation of resources in a wireless communications environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Turning now to the drawings, FIG. 1 illustrates a system 100 that facilitates allocation of resources to effectuate SDMA on a forward-link in a wireless communications environment in general, and in an OFDM/OFDMA environment in particular. The system 100 includes a codebook generator 102 that can receive data from a plurality of access terminals 104-108 within a particular sector, wherein the access terminals 104-108 can be distributed throughout the sector. For example, the codebook generator 102 can cause pilot signals to be provided to the access terminals 104-108, and the access terminals 104-108 can generate data relating to condition of a channel, such as Channel Quality Indicator (CQI) data and provide such data to the codebook generator 102. While CQI is given as an example, it is understood that any suitable feedback data can be provided by the access terminals 104-108 to the codebook generator. Based at least in part upon the feedback, the codebook generator 102 can determine whether each of the access terminals 104-108 is a candidate for employment of SDMA, diversity communications (channel diversity), preceding, etc.

Utilizing the feedback, the codebook generator 102 can utilize, or update, a codebook 110 that can include multiple portions that allow user devices to be scheduled via SDMA. For instance, a first portion can include beamforming weights so that a first set of access terminals can be scheduled according to SDMA with respect to other access terminals scheduled on other beamforming weights in other portions of the codebook or other codebooks. In a particular example, an access terminal assigned to the first portion can share time-frequency resources with an access terminal assigned to the second portion, as such access terminals are a sufficient spatial distance apart from one another. In contrast, access terminals assigned within a same portion may not be able to share time-frequency resources without causing a substantial amount of cross talk therebetween. The codebook 110 can also include information relating to which beams to schedule access terminals within the plurality of access terminals 104-108 that are not candidates for SDMA, and thus are not to share time-frequency resources with other access terminals within the sector. For instance, access terminals or control channels that are not candidates for employment of SDMA may be configured for channel diversity, preceding, or to receive broadcast data, and thus should not share time-frequency resources with other access terminals in that portion of the codebook. In one particular example, the codebook generator 102 can update the codebook 110 as it receives packets from the access terminals 104-108 (e.g., the codebook 110 can be updated on a per-packet basis).

A scheduler 112 can receive the codebook 110 and allocate resources within the wireless communications environment. In more detail, the scheduler 112 can map the access terminals 104-108 to hop-ports and/or assign a hop permutation based upon an analysis of the codebook 110, and can also map the hop-ports to particular frequencies. In one particular example, each hop-port can be mapped to a sixteen-tone frequency region. To enable SDMA to be employed within a wireless communication system, the scheduler 112 can analyze two or more disparate channel trees, wherein a channel tree is a mapping of port space onto an available frequency region. The base nodes of a channel tree may correspond to non-overlapping contiguous tones, thereby guaranteeing orthogonality between access terminals associated with the channel tree. If two or more channel trees are associated with a same frequency region, access terminals associated with disparate trees can be scheduled in a manner so that they share time-frequency resources.

The scheduler 112 can allocate time frequency resources through utilization of two or more channel trees in several disparate manners, which are described in more detail below. Briefly, the scheduler 112 can assign access terminals to hop-ports that are mapped to a frequency range on a first channel tree, and not assign access terminals to corresponding hop-ports (that map to a same frequency range) on a second channel tree. This can be done to aid in maintenance of orthogonality with respect to access terminals that are not candidates for use of SDMA, as these access terminals are not scheduled to share time-frequency resources. The scheduler 112 can also assign access terminals that are candidates for SDMA (within the first portion of the codebook 110) to one or more hop-ports, wherein the hop-ports are mapped to particular frequency ranges in the first channel tree. Thereafter, disparate access terminals that are candidates for utilization of SDMA (within the second portion of the codebook 110) can be associated with hop-ports that are mapped to substantially similar frequency ranges on the second channel tree.

In one example, mapping of hop-ports to frequencies within the two or more channel trees can be done in a random fashion during a scheduled permutation. This permutation can aid in creating interference diversity, but may negatively affect scalability. In another example, mapping of hop-ports to frequency ranges within the channel trees can correspond precisely. For instance, at a given permutation, if a first access terminal is assigned to a first set of hop-ports on a first channel tree, then a corresponding access terminal is assigned to a second set of hop-ports on the second channel tree, wherein the second set of hop-ports corresponds to the first set of hop-ports in terms of frequencies to which the hop-ports are mapped. Moreover, hop-ports within the corresponding sets can be mapped to corresponding frequencies. In other words, except for hop-ports associated with access terminals that are not candidates for SDMA mode, the channel trees can mirror one another. In still another example, mapping of hop-ports to frequency ranges between channel trees can be implemented as a combination of correspondence and randomness. For instance, if a first access terminal is assigned to a first set of hop-ports on a first channel tree, then a corresponding access terminal can be assigned to a second set of hop-ports on a second channel tree, wherein the second set of hop-ports corresponds to the first set of hop-ports in terms of frequencies to which the hop-ports are mapped. However, individual hop-ports within the sets of hop-ports can be mapped to frequencies in a random fashion. Thus, while sets of hop-ports correspond between channel trees, individual hop-ports within the sets may not correspond. Thus, the scheduler 112 can utilize various permutations of channel trees in connection with determining a schedule 114 of communications with respect to the access terminals 104-108.

Figure 2:
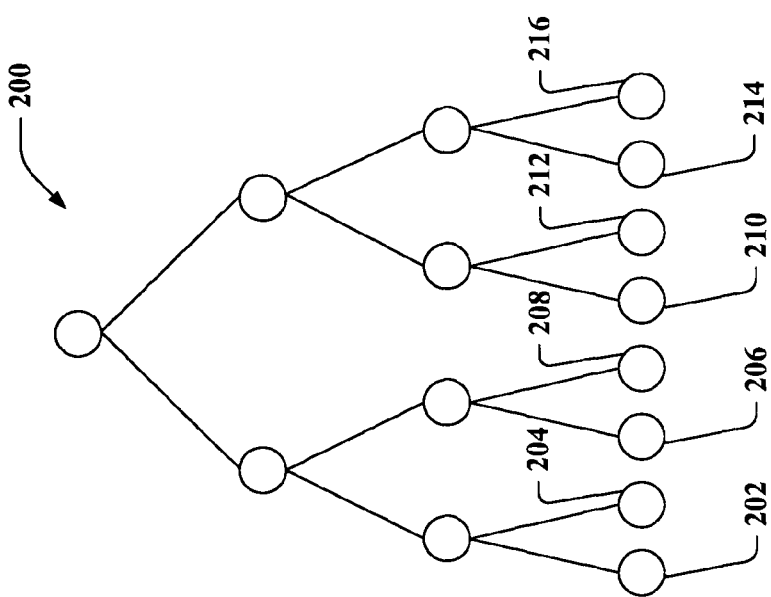
FIG. 2 is a representation of a channel tree.

Referring now to FIG. 2, an exemplary channel tree structure 200 that can be utilized in connection with allocating resources on a forward link within an OFDM/OFDMA wireless communications environment is illustrated. The tree structure 200 represents a mapping of port space onto an available frequency region. Base nodes 202-216 of the tree structure 200 may correspond to non-overlapping contiguous tones so that all access terminals scheduled within the same tree will be associated with orthogonality. In conventional OFDM/OFDMA systems, a single tree structure can be employed to schedule communications within a sector, wherein access terminals scheduled within the channel tree will be associated with channel orthogonality. To enable employment of SDMA, multiple channel trees can be employed, wherein access terminals on disparate trees can utilize substantially similar time-frequency resources.

Figure 3:
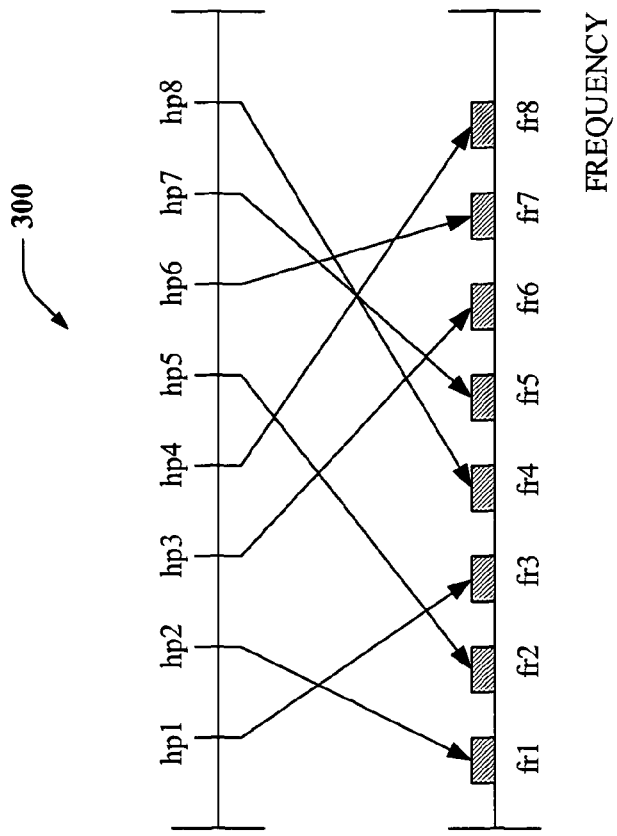
FIG. 3 is a representation of base nodes of a channel tree.

Turning to FIG. 3, an exemplary graphical depiction of a mapping between hop-ports and frequency regions 300 that is represented by the base nodes 202-216 of the tree structure 200 (FIG. 2) is illustrated. The mapping can correspond to one particular permutation, as hop-ports can be subject to mapping to various frequency ranges given disparate permutations. In particular, the tree structure 200 can include eight base nodes 202-216—accordingly, eight hop-ports may be mapped to eight different frequency ranges that are within an available frequency region during one hop permutation. In more detail, a first hop-port can be mapped to a third frequency range (fr3), a second hop-port can be mapped to a first frequency range (fr1), a third hop-port can be mapped to a sixth frequency range (fr6), and so forth during the hop permutation. These mappings can be assigned randomly, pseudo-randomly, or through any other suitable means. Furthermore, the mappings can be re-assigned during at particular time intervals and/or according to a permutation schedule. It is also to be understood that these mappings enable access terminals that are associated with the hop-ports within the channel tree 200 to remain related to orthogonal channels (e.g., the frequency ranges can be created in such a way to maintain orthogonality). Furthermore, while shown as a tree, it can be discerned that the channel tree structure 200 can be retained in matrix form or other suitable form to assist in scheduling access terminals in a wireless communications environment.

Figure 4:
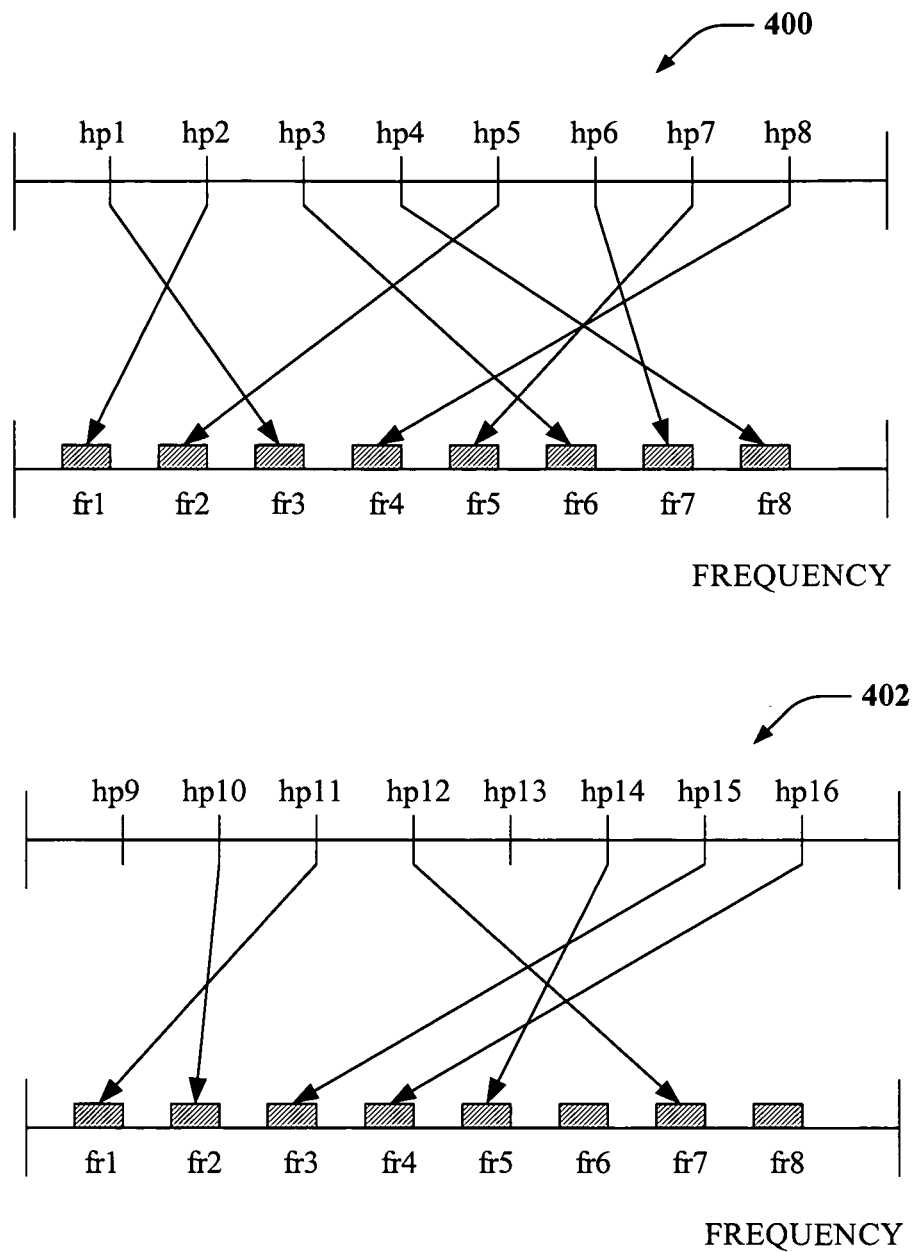
FIG. 4 is a depiction of base nodes of two separate channel trees, the depiction illustrates one particular manner of allocating time-frequency resources.

Now referring to FIG. 4, one exemplary manner of assigning/scheduling access terminals on two disparate channel trees is illustrated through utilization of representations 400 and 402 of based nodes of such channel trees. As alluded to above, a codebook can be generated that includes at least two clusters of access terminals that can operate in SDMA mode (e.g., are not waiting for broadcast transmissions, undertaking preceding, . . . ). These clusters can be created through an access terminal indication of preferred beams as well as through feedback of a CQI associated with the preferred beams. Accordingly, access terminals in the first cluster can share time-frequency resources with access terminals in a second cluster, while access terminals within a same cluster should not share time-frequency resources.

The representation 400 depicts base nodes of a first channel tree, wherein mapping between hop-ports and frequency ranges within an available frequency region with respect to one particular permutation is defined. The first channel tree can be a primary tree, where access terminals that are not candidates to operate in SDMA mode are scheduled/assigned together with access terminals within the first cluster of access terminals. Thus, for instance, a first access terminal (which is to operate in SDMA mode) can be assigned to first and second hop-ports (hp1 and hp2), which are randomly mapped to a third and first frequency range (fr3 and fr1), respectively, for the permutation. The term "randomly" as used herein is intended to encompass both truly random mapping as well as pseudo-random mapping of hop-ports to frequency ranges. A second access terminal (which is not a candidate to operate in SDMA mode) can be associated with third and fourth hop-ports (hp3 and hp4), which may be randomly mapped to a sixth and eighth frequency range (fr6 and fr8), respectively. A third access terminal (which is to operate in SDMA mode) can be associated with fifth, sixth, seventh, and eighth hop-ports (hp5, hp6, hp7, and hp8), which may be randomly mapped to second, seventh, fifth, and fourth frequency ranges (fr2, fr7, fr5, and fr4), respectively. Thus, the first channel tree can include hop-ports that are associated with access terminals that are to operate in SDMA mode as well as access terminals that are not to operate in SDMA mode, and the mapping of hop-ports to frequency ranges can be accomplished in a random or pseudo-random fashion. Further, disparate users can be assigned to different hop-ports over time, and same users can maintain an association with hop-ports as they are mapped to disparate frequencies after a hop permutation.

The representation 402 depicts base nodes of a second channel tree, which can be employed to schedule communications with respect to access terminals that are to operate in SDMA mode. More particularly, access terminals scheduled/assigned with respect to the second channel tree may share time-frequency resources with access terminals scheduled/assigned with respect to the first channel tree. For instance, a fourth access terminal that is to operate in SDMA mode can be assigned to tenth and eleventh hop-ports, which can be randomly assigned to any suitable frequency ranges within the available frequency region except for the sixth and eighth frequency range (fr6 and fr8), as such ranges are reserved on the first channel tree for access terminals that are not operating in SDMA mode. In the representation 402, the tenth and eleventh hop-ports (hp10 and hp11) are randomly mapped to the second and first frequency ranges (fr2 and fr1), respectively. A fifth access terminal that is to operate in SDMA mode can be assigned to a twelfth hop-port (hp12), which is randomly mapped to a seventh frequency range (fr7), and a sixth access terminal that is to operate in SDMA mode can be assigned to hop-ports 14-16, which are randomly mapped to the fifth, third, and fourth frequency ranges (fr5, fr3, and fr4), respectively. This random mapping between hop-ports and frequency ranges provides interference diversity on the forward link for access terminals operating in SDMA mode, as access terminals associated with disparate channel trees may not correspond. In summary, hop-ports associated with two channel trees can be randomly mapped to frequency ranges during hop permutations, thereby enhancing interference diversity.

Figure 5:
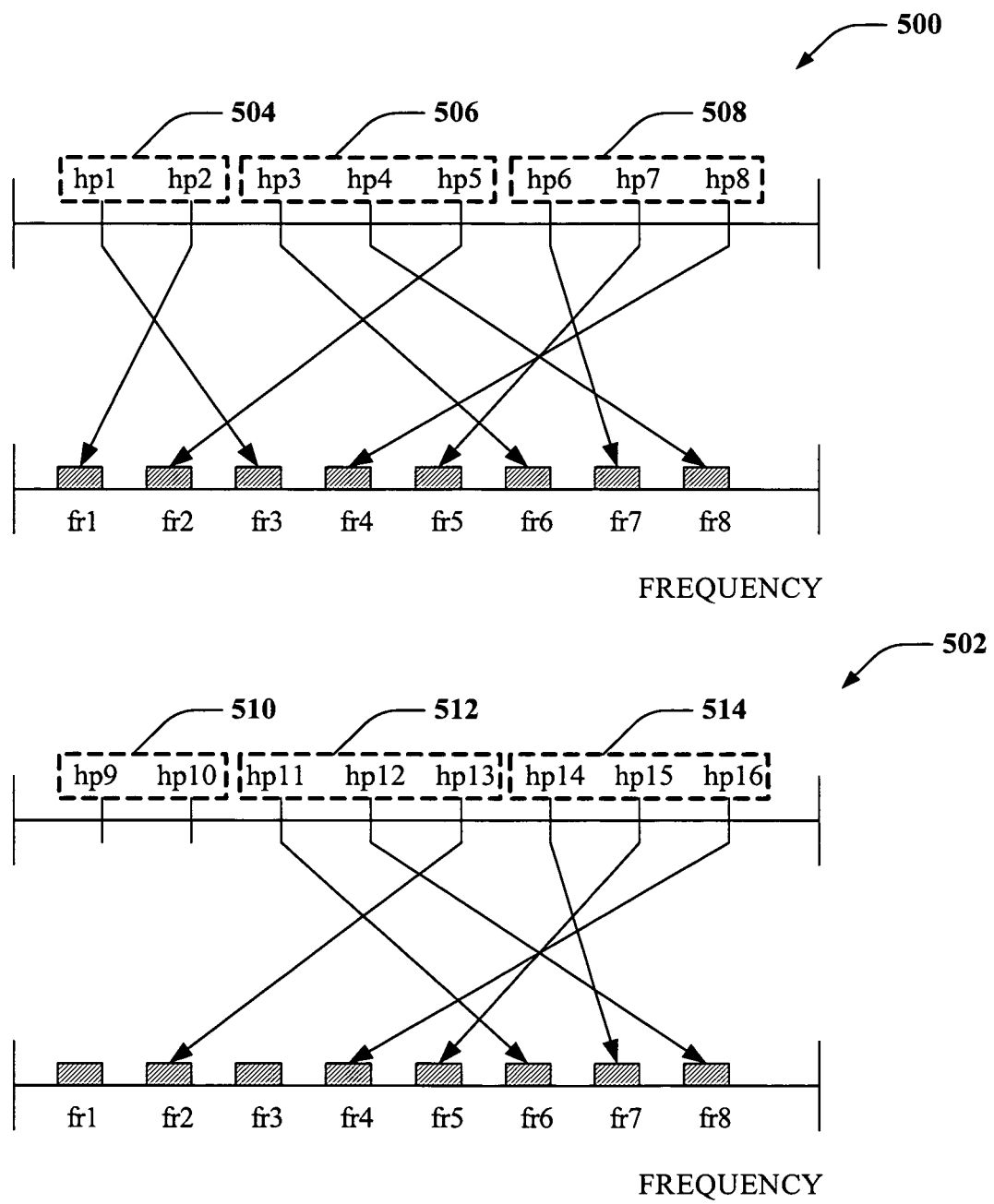
FIG. 5 is a depiction of base nodes of two separate channel trees, the depiction illustrates one particular manner of allocating time-frequency resources.

Turning now to FIG. 5, another exemplary manner for allocating resources through use of two channel trees, the base nodes of which are represented in graphical depictions 500 and 502, is illustrated. The representation 500 depicts base nodes of a first channel tree, wherein mapping between hop-ports and frequency ranges within an available frequency region is defined with respect to one hop permutation. In the representation 500, sets of hop-ports can be assigned to a particular access terminal or set of access terminals. For instance, a first set of hop-ports 504 can include first and second hop-ports (hp1 and hp2), which may be assigned to a first access terminal. In the exemplary depictions 500 and 502, the first access terminal is not a candidate for operating in SDMA mode. Hp 1 and hp2 are depicted as being randomly mapped to first and third frequency ranges (fr1 and fr3), respectively. It is understood, however, that the mapping of hop-ports to frequency ranges can be determined as a function of access terminal feedback, mode of operation of an access terminal, or any other suitable parameter. A second access terminal (which is to operate in SDMA mode) can be assigned to a second set of hop-ports 506, wherein such set 506 includes hop-ports 3-5 (hp3, hp4, hp5). These hop-ports are mapped to sixth, seventh, and second frequency ranges, respectively. The first channel tree can further include information relating to a set of hop-ports 508, wherein the set 508 includes hop-ports 6-8. These hop-ports are assigned to a third access terminal that is to operate in SDMA mode, wherein the hop-ports are mapped to seventh, fourth, and fifth frequency ranges (fr7, fr4, and fr5), respectively.

As SDMA mode relates to sharing of time-frequency resources with respect to access terminals, a second channel tree (the base nodes of which are represented by the depiction 502) can be employed. The second channel tree can be utilized to schedule access terminals on overlapping frequencies during the hop permutation. For instance, access terminals on overlapping frequencies can utilize disparate beams for receipt and transmission of data, wherein such beams can aid in maintaining a threshold level of cross talk. A determination of an appropriate beam can be made based upon spatial signatures associated with one or more access terminals. As can be discerned from reviewing the depiction 502, sets of hop-ports and mappings correspond to sets of hop-ports and mappings within the depiction 500 (e.g., base level nodes of the two channel trees correspond except with respect to hop-ports assigned to access terminals that are not scheduled for SDMA mode). In more detail, a fourth set of hop-ports 510 corresponds to the first set of hop-ports 504. However, as the first set of hop-ports 504 is associated with an access terminal that is not to operate in SDMA mode, the fourth set of hop-ports is not mapped to a frequency range and thus is not assigned access terminals. A fifth set of hop-ports 512 corresponds to the second set of hop-ports 506. That is, the fifth set of hop-ports 512 includes eleventh, twelfth, and thirteenth hop-ports, which are mapped to frequency ranges that hop-ports within the second set of hop-ports 506 are mapped during the hop permutation (e.g., a fourth access terminal is associated with the fifth set of hop-ports 512 and shares time-frequency resources with the second access terminal). A sixth set of hop-ports 514, which includes fourteenth, fifteenth, and sixteenth hop-ports (hp14, hp 15, and hp16), corresponds to the third set of hop-ports (e.g., hop-ports within the sixth set of hop-ports 514 are mapped to frequencies that correspond to mappings associated with hop-ports within the third set of hop-ports 508). In more detail, hp14, hp15, and hp 16 are mapped to fr7, fr4, and fr5, respectively, during the permutation. Assigning users to correspondingly mapped hop-ports increases system scalability—however, interference diversity may be negatively affected.

Figure 6:
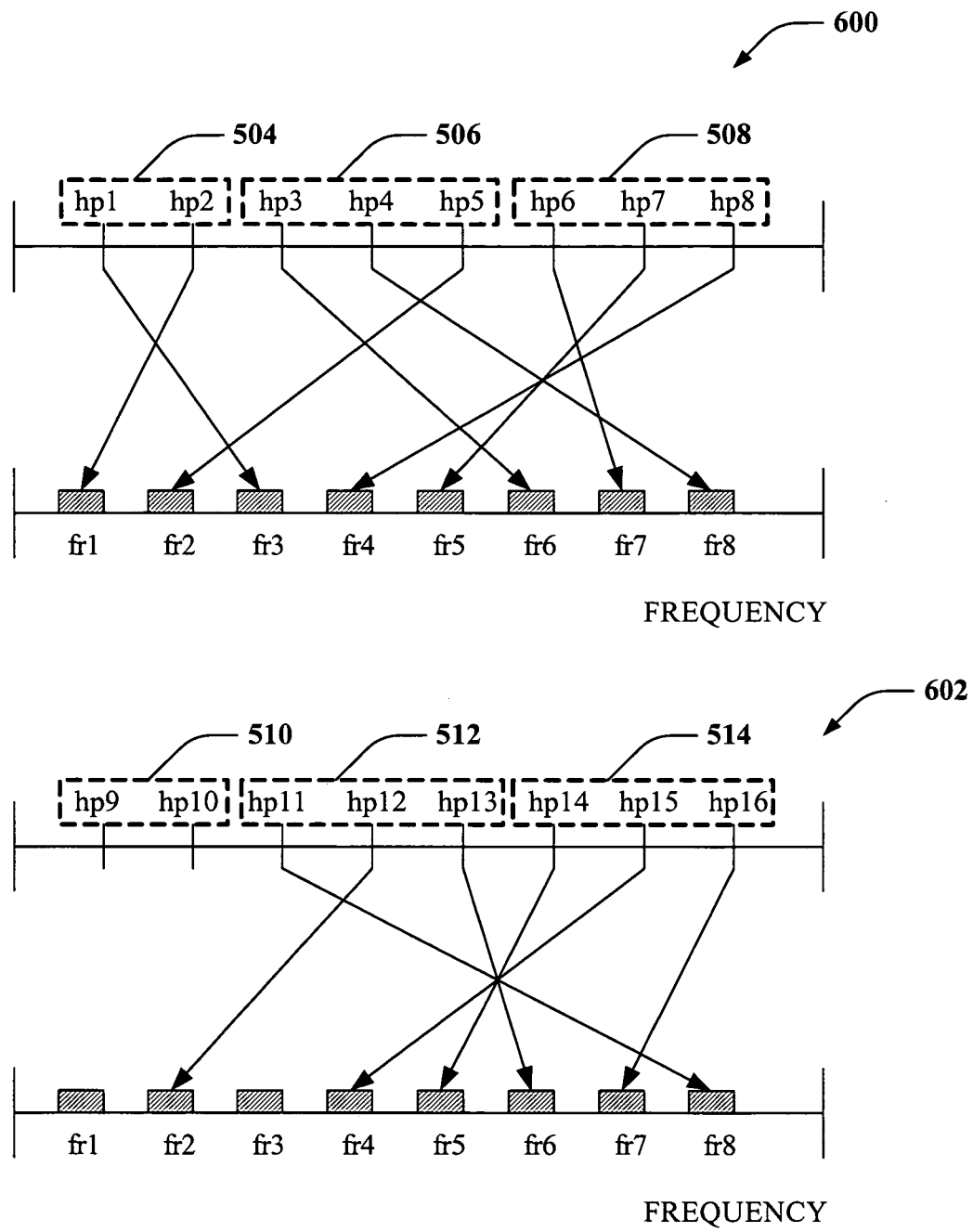
FIG. 6 is a depiction of base nodes of two separate channel trees, the depiction illustrates one particular manner of allocating time-frequency resources.

Referring to FIG. 6, a disparate manner of allocating resources in a wireless communications environment through employment of two channel trees is illustrated. Representations 600 and 602 of base nodes of a first and second channel tree, respectively, are illustrated, wherein the channel trees can be utilized by the scheduler 112 (FIG. 1) to schedule communications in the wireless environment. The representation 600 associated with the first channel tree shows that sets of hop-ports can be associated with access terminals, and the hop-ports can be assigned to frequency ranges either randomly or per a suitable algorithm within the scheduler 112 (FIG. 1) for each hop permutation. The representation 600 is substantially similar to the representation 500 of FIG. 5, including similar sets of hop-ports (504-508) and similar mappings to frequency ranges.

The mappings shown within the representation 602 of base nodes of the second channel tree, however, are generated in a disparate manner. Rather than mappings of hop-ports within sets associated with the second channel tree corresponding identically to mappings of hop-ports within sets associated with the first channel tree, hop-ports within sets of the associated with the second channel tree can be randomly mapped to frequency ranges associated with the corresponding sets within the first channel tree. In more detail, the representation 602 can include the fourth set of hop-ports 510, which corresponds to the first set of hop-ports 504 in the representation 600. As the first set of hop-ports 504 is associated with an access terminal that will not operate in SDMA mode, hop-ports within the fourth set 510 are not mapped, and frequency ranges fr1 and fr3 are utilized solely by the first access terminal. The fifth set of hop-ports 512 includes hp11-13, which correspond to hp3-5 in the second set of hop-ports 506. As hp3-5 are associated with fr6, fr8, and fr2, respectively, such frequencies will be mapped to hp11-13. However, hp11-13 can be randomly mapped to these frequency ranges—thus, for instance, hp11 can be mapped to fr8, hp12 can be mapped to fr2, and hp13 can be mapped to fr6. Thus, user assignments to sets of hop-ports can correspond between the first and second channel trees, but hop-ports within the sets can be randomly assigned to frequency ranges. The set of hop-ports 514 can include hp14-hp16, which are mapped to fr5, fr4, and fr7. This manner of allocating resources in a wireless environment, within which SDMA is desirably employed, provides scalability as well as interference diversity between hop-ports.

Figure 7:
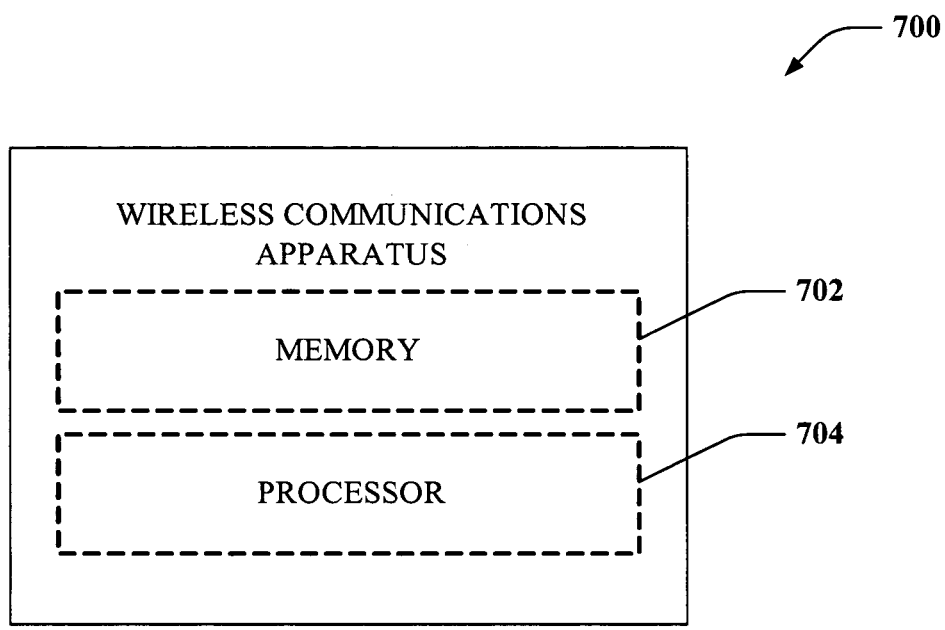
FIG. 7 is a wireless communications apparatus that can be employed to allocate resources in a wireless communications environment.

Now turning to FIG. 7, a wireless communications apparatus 700 that can be employed to effectuate allocation of resources in a wireless communications environment in which SDMA is desirably employed is illustrated. The apparatus 700 can include a memory 702, within which a codebook can be retained and/or maintained. As described above, the codebook can include data relating to whether access terminals are candidates for use of SDMA at a particular instance in time (e.g., which can be determined on a per-packet basis). In more detail, the codebook can include quantized values that are indicative of spatial directions associated with access terminals. Furthermore, the memory 702 can include representations of channel trees that may be utilized to schedule communications in, for example, an OFDM/OFDMA environment. The channel trees can include mappings between hop-ports and frequency ranges, where frequency ranges can be re-used for access terminals that are scheduled in SDMA mode. Moreover, the mappings can be altered according to various hop permutations.

This information can be provided to a processor 704, which can then schedule communications in the wireless environment accordingly. In one example, the processor 704 can analyze a first channel tree and define mappings within a second channel tree based at least in part upon content of the first channel tree. For instance, content of the first channel tree can cause restriction with respect to frequency ranges in the second channel tree. Similarly, a hop permutation can be utilized to define multiple mappings between hop-ports and frequency ranges in a first channel tree as well as a second channel tree.

In another example, as alluded to above, access terminals can be scheduled over SDMA dimensions over substantially similar time-frequency resources on a packet-by-packet basis. The SDMA factor may be a function scheduling undertaken by the processor 704. More specifically, the processor 704 can assign one or more access terminal to a channel that corresponds to substantially similar time-frequency blocks in subsequent transmissions. A multiplexing order may be fully controlled by the processor 704 during scheduling, where well separated access terminals can be double or triple scheduled over one channel and other access terminals may not be spatially multiplexed. In yet another example, the processor 704 can be employed in connection with optimizing interference diversity by randomly overlapping SDMA-enabled access terminals across frequency and time. The processor 704 can partition overall time-frequency resources into segments of different multiplexing order. For segments with multiplexing order N, there may be N set of channels, where each set is orthogonal but overlapping between sets (See. FIG. 6). Overlapping channels may have different hopping sequences in time and frequency in order to maximize intra-sector interference diversity.

Referring to FIGS. 8-11, methodologies relating to allocating resources to enable SDMA in an OFDM/OFDMA environment are illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 8:
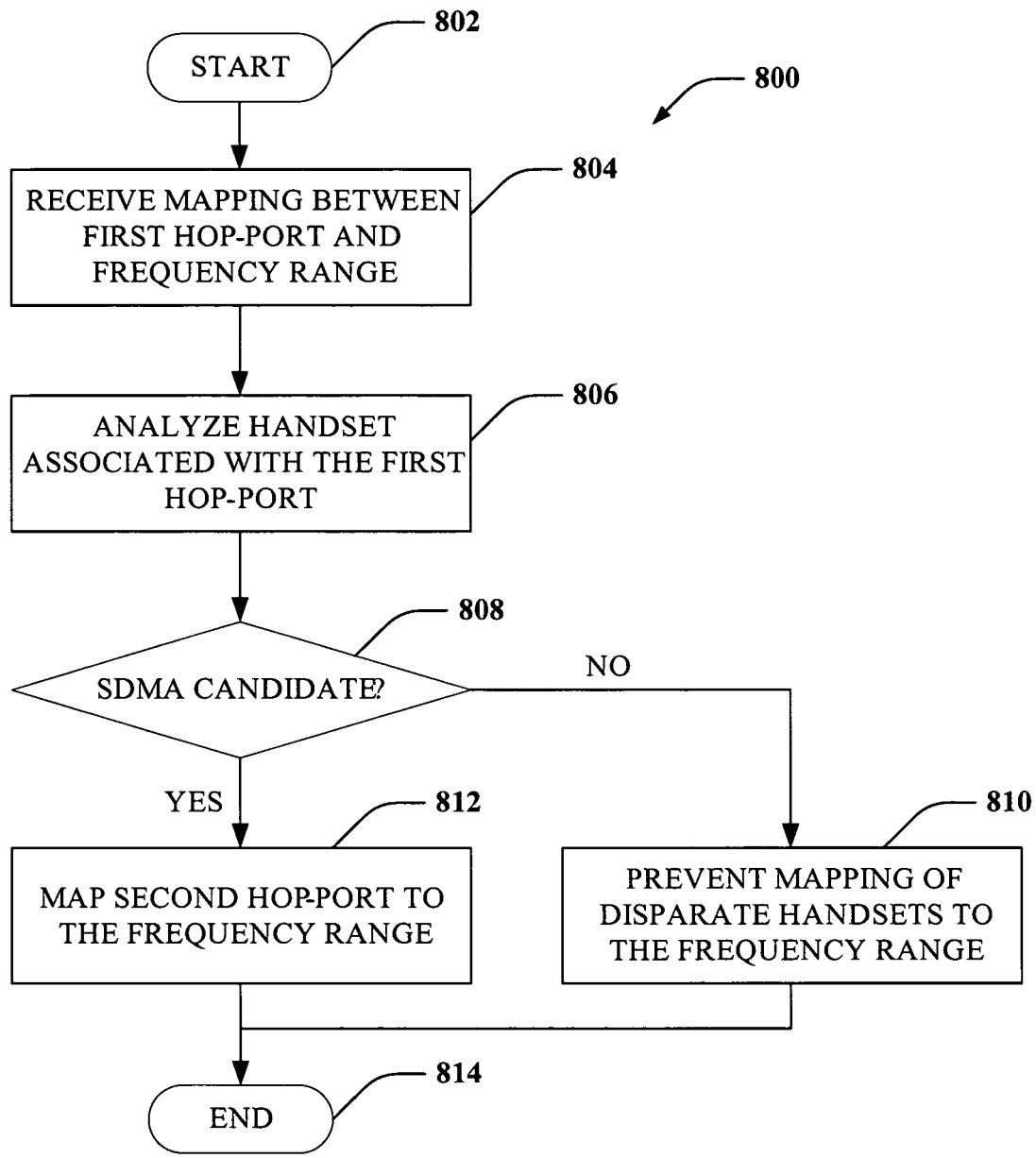
FIG. 8 is a flow diagram illustrating a methodology for allocating time-frequency resources in a wireless communications environment.

Referring solely to FIG. 8, a methodology 800 for allocating resources in a wireless environment is illustrated. The methodology 800 starts at 802, and at 804 a mapping between a first hop-port and a frequency range is received. For instance, this mapping can be existent within a first channel tree after a particular permutation, which can be received by a scheduler (that may be associated with a processor). Moreover, the hop-port can be mapped to a particular frequency range based upon an access terminal or user associated with such hop-port as well as other hop-ports and frequency ranges assigned thereto. At 806, an access terminal assigned to the first hop-port is analyzed. For instance, feedback can be received from the access terminal relating to CQI for a particular beam, a preferred beam, and the like. Moreover, while not shown, data from other access terminals can also be received and analyzed.

At 808, a determination is made regarding whether the access terminal is a candidate to employ SDMA. For example, if the access terminal is waiting for broadcast data or is operating in diversity mode, such access terminal will not be a candidate to employ SDMA. Similarly, if the access terminal is requesting preceding, such access terminal may not be a candidate for employment of SDMA on the forward link. If the access terminal is not a candidate for employment of SDMA, then at 810 other hop-ports will not be mapped to the frequency range to which the first hop-port is mapped. This ensures channel diversity and orthogonality with respect to the channel utilized by the access terminal. If the access terminal is a candidate for employment of SDMA, then at 812 a second hop-port is mapped to the frequency range to which the first hop-port is mapped. The methodology 800 completes at 814.

Figure 9:
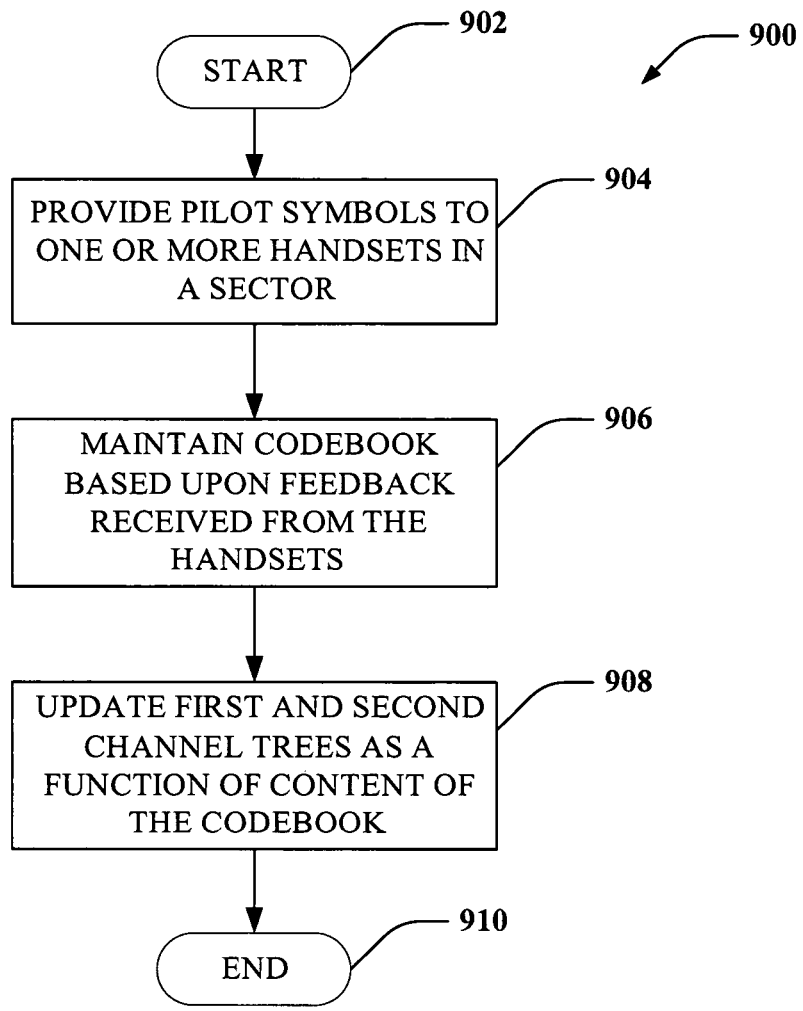
FIG. 9 is a flow diagram illustrating a methodology for updating channel trees as a function of content of a codebook.

Now referring to FIG. 9, a methodology 900 for utilizing a codebook in connection with allocating resources in a wireless communications environment is illustrated. The methodology 900 begins at 902, and at 904 one or more pilot symbols are provided to an access terminal within a sector. For instance, when operating in SDMA mode, an access terminal may indicate a preferred beam (from an SDMA cluster) as well as feedback the CQI associated with the preferred beam. A CQI pilot channel (F-CPICH), which can be scheduled periodically in block hopping mode, may be employed to estimate a broadband frequency domain channel response on physical transmit antennas. At 906, a codebook is maintained based upon the feedback received from the access terminal. For instance, signal qualities from entries of the codebook can be computed based upon the CQI pilot channel feedback. These signal qualities can be employed in connection with clustering users (and thus maintaining the codebook). In more detail, each access terminal in SDMA mode can report a preferred beam index that is retained within a particular SDMA cluster within the codebook. Access terminals corresponding to the same SDMA cluster are placed into a substantially similar group, wherein users within the group are scheduled so that they remain orthogonal (e.g. they do not overlap). This is because beams within same SDMA clusters may have similar spatial characteristics; therefore, access terminals utilizing these beams are likely to have similar spatial characteristics and should not be overlapped. At 908, first and second channel trees are updated based upon content of the codebook. For instance, users within a same group can be scheduled upon a same channel tree. Users in separate groups may share time-frequency resources, and thus can be scheduled upon separate channel trees. The methodology 900 completes at 910.

Figure 10:
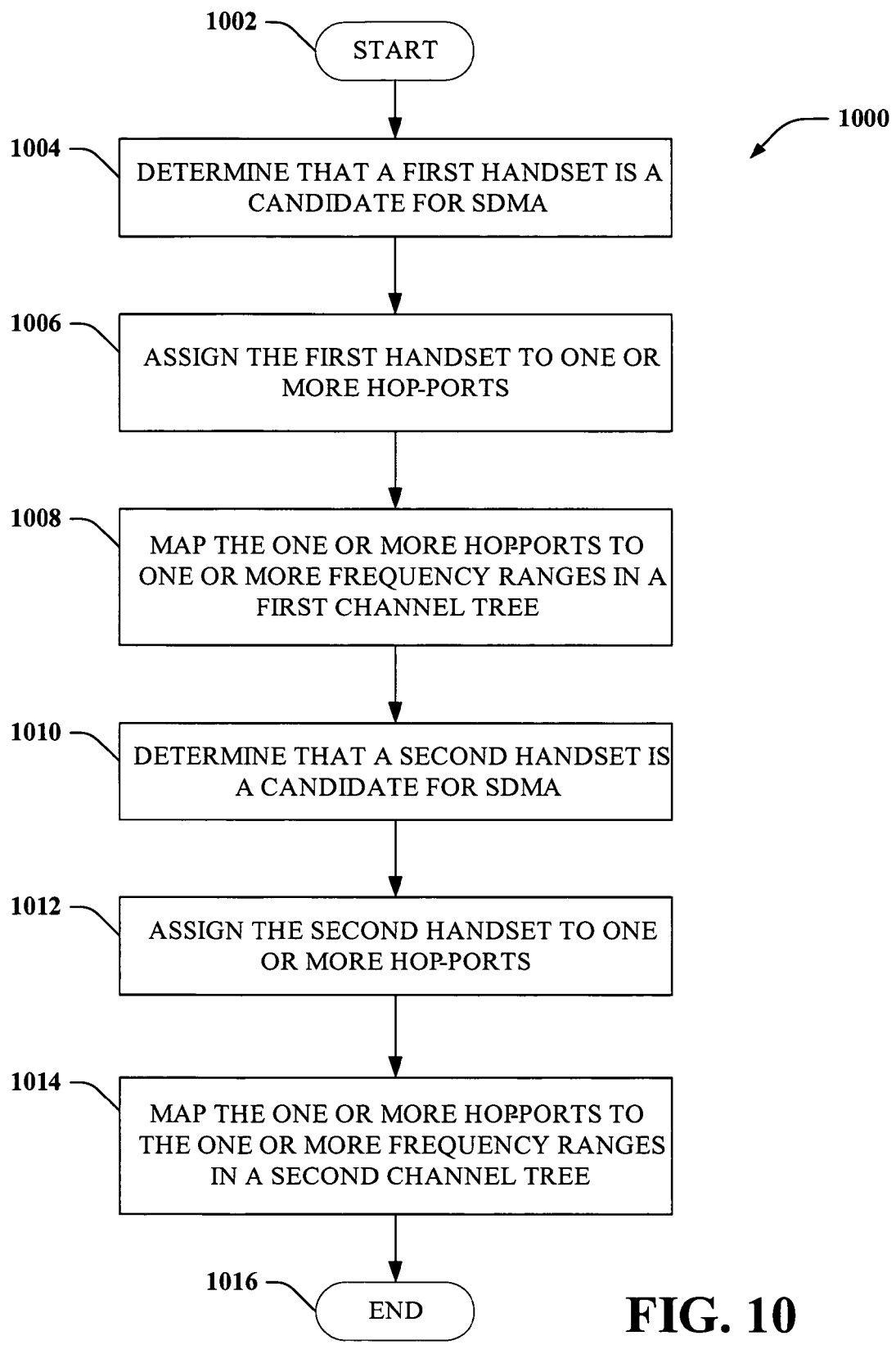
FIG. 10 is a flow diagram illustrating a methodology for mapping hop-ports to frequency ranges in multiple channel trees.

Turning to FIG. 10, a methodology 1000 for allocating resources in a wireless communications environment is illustrated. The methodology 1000 begins at 1002, and at 1004 it is determined that a first access terminal is a candidate for utilization of SDMA. For instance, a codebook can be maintained and analyzed to determine that the access terminal is a candidate for employment of SDMA. In a detailed example, it can be determined that the access terminal is spatially separate a sufficient distance from a disparate access terminal to utilize SDMA. At 1006, the first access terminal is assigned to one or more hop-ports, and at 1008 the one or more hop-ports are mapped to one or more frequency ranges in a first channel tree. It is understood, however, that the hop-ports can be mapped to frequencies prior to being assigned an access terminal, and that an order of acts of the methodology 1000 can alter depending upon context and/or implementation. At 1010, it is determined that a second access terminal is a candidate for employment of SDMA, and at 1012 the second access terminal is assigned to one or more hop-ports. At 1014, the one or more hop-ports associated with the second access terminal are mapped to the same frequency range(s) to which the one or more hop-ports associated with the first access terminal are mapped. This enables the first access terminal and the second access terminal to share time-frequency resources. The methodology 1000 then completes at 1016.

Figure 11:
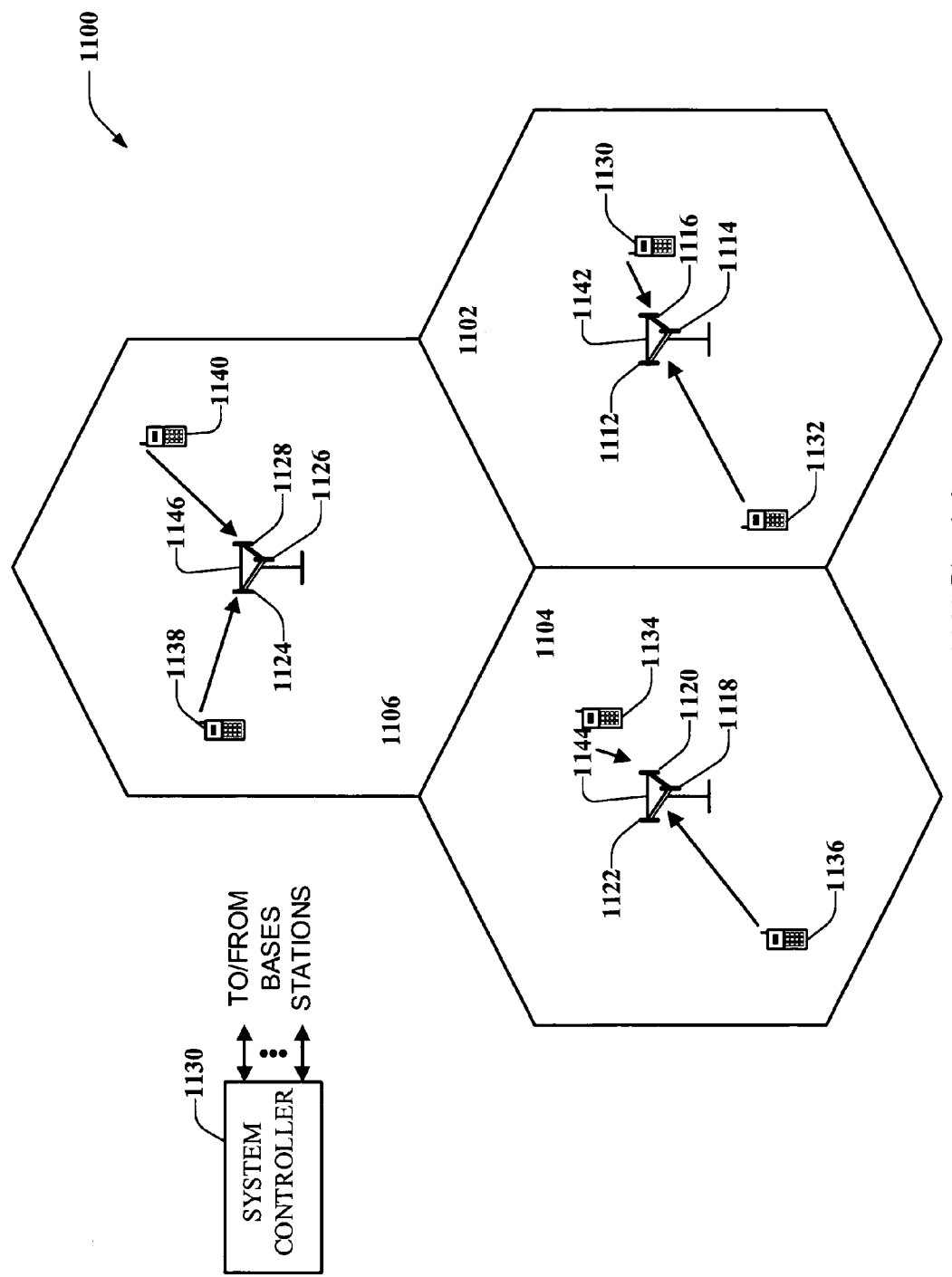
FIG. 11 is an exemplary wireless communications system.

FIG. 11 illustrates an exemplary multiple access wireless communication system. A multiple access wireless communication system 1100 includes multiple cells, e.g. cells 1102, 1104, and 1106. In the exemplary system illustrated in FIG. 11, each cell 1102, 1104, and 1106 may include an access point 1150 that includes multiple sectors. The multiple sectors are formed by groups of antennas each responsible for communication with access terminals in a portion of the cell. In cell 1102, antenna groups 1112, 1114, and 1116 each correspond to a different sector. In cell 1104, antenna groups 1118, 1120, and 1122 each correspond to a different sector. In cell 1106, antenna groups 1124, 1126, and 1128 each correspond to a different sector.

Each cell includes several access terminals which are in communication with one or more sectors of each access point. For example, access terminals 1130 and 1132 are in communication with access point (or base station) 1142, access terminals 1134 and 1136 are in communication with access point 1144, and access terminals 1138 and 1140 are in communication with access point 1146.

As illustrated in FIG. 11 each access terminal 1130, 1132, 1134, 1136, 1138, and 1140 is located in a different portion of its respective cell than each other access terminal in the same cell. Further, each access terminal may be a different distance from the corresponding antenna groups with which it is communicating. Both of these factors provide situations, also due to environmental and other conditions in the cell, to cause different channel conditions to be present between each access terminal and its corresponding antenna group with which it is communicating.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station, a access terminal, or some other terminology.

In one example, a set of known beams may be utilized at the base-station in order to provide SDMA, e.g. fixed or adaptive sectors. If the base station is aware of the best beam for every user, it can allocate the same channel for different users if they are to be receiving data on different beams. In another example, system 1100 may include an omni-directional beam that corresponds to no pre-coding. The base station would use this beam for broadcast or multicast transmissions. In still another example, the system 1100 may utilize pre-coding without SDMA if such channel information is reported to the user.

The SDMA index can be a parameter that may change relatively slowly. This may occur since the index(es) used to calculate the SDMA index captures the spatial statistics of a user which may be measured by a mobile device. This information can be used by the mobile device to compute the beam preferred by it and indicating this beam to the base station. Even without power allocation, knowing the channel at the transmitter improves capacity especially for those systems where the number of transmit antennas $T_M$ is greater than the number of receive antennas $R_M$. The capacity improvement is obtained by transmitting along the directions of the channel Eigen vectors. Feeding back the channel requires overhead.

SDMA provides a sufficiently rich set of beams at the transmitter that allows full flexibility in scheduling. The users are scheduled on beams that are signaled to the base station through some feedback mechanism. For efficient scheduling, the transmitter should have the channel quality information over each user if a certain beam is used to schedule the user.

Figure 12:
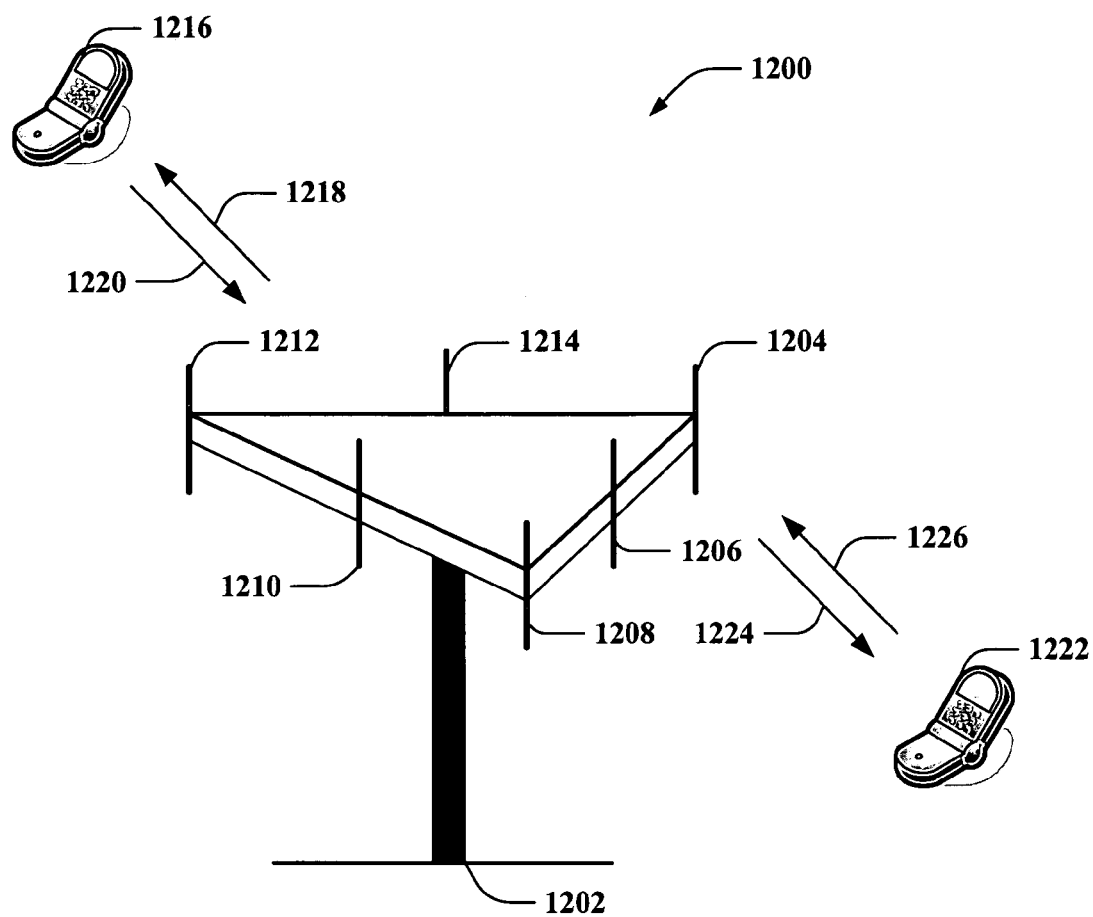
FIG. 12 is an illustration of an exemplary wireless communications system.

FIG. 12 illustrates an exemplary wireless communication system 1200. A three-sector base station 1202 includes multiple antenna groups, one including antennas 1204 and 1206, another including antennas 1208 and 1210, and a third including antennas 1212 and 1214. Only two antennas are illustrated for each antenna group, however, more or fewer antennas may be utilized for each antenna group. Mobile device 1216 is in communication with antennas 1212 and 1214, where antennas 1212 and 1214 transmit information to mobile device 1216 over forward link 1218 and receive information from mobile device 1216 over reverse link 1220. Mobile device 1222 is in communication with antennas 1204 and 1206, where antennas 1204 and 1206 transmit information to mobile device 1222 over forward link 1224 and receive information from mobile device 1222 over reverse link 1226.

Each group of antennas and/or the area in which they are designated to communicate may be referred to as a sector of base station 1202. For instance, antenna groups each may be designed to communicate to mobile devices in a sector of the areas covered by base station 1202. A base station may be a fixed station used for communicating with the terminals and may also be referred to as an access point, a Node B, or some other terminology. A mobile device may also be called a mobile station, user equipment (UE), a wireless communication device, terminal, access terminal, user device, a handset, or some other terminology.

SDMA can be used with frequency division systems such as an orthogonal frequency division multiple access (OFDMA) system. An OFDMA system partitions the overall system bandwidth into multiple orthogonal subbands. These subbands are also referred to as tones, carriers, subcarriers, bins, and/or frequency channels. Each subband is associated with a subcarrier that can be modulated with data. An OFDMA system may use time and/or frequency division multiplexing to achieve orthogonality among multiple data transmissions for multiple user devices. Groups of user devices can be allocated separate subbands, and the data transmission for each user device may be sent on the subband(s) allocated to this user device.

Figure 13:
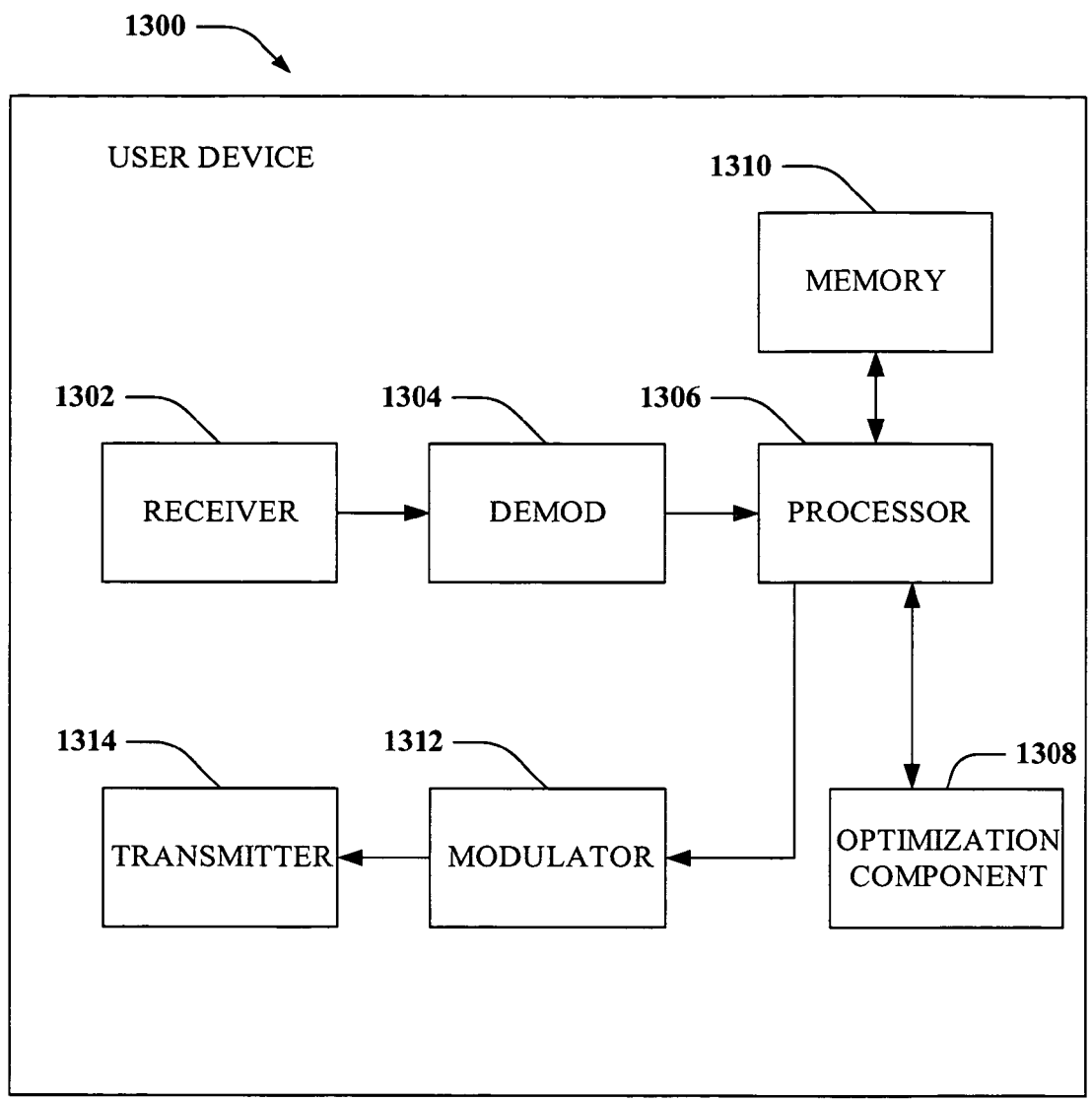
FIG. 13 is an illustration of a system that utilizes beamforming to increase system capacity in a wireless communications environment.

FIG. 13 illustrates a system 1300 that utilizes SDMA to increase system capacity in a wireless communication environment. System 1300 can reside in a base station and/or in a user device, as will be appreciated by one skilled in the art. System 1300 comprises a receiver 1302 that receives a signal from, for instance, one or more receive antennas, and performs typical actions thereon (e.g., filters, amplifies, downconverts, . . . ) the received signal and digitizes the conditioned signal to obtain samples. A demodulator 1304 can demodulate and provide received pilot symbols to a processor 1306 for channel estimation.

Processor 1306 can be a processor dedicated to analyzing information received by receiver component 1302 and/or generating information for transmission by a transmitter 1314. Processor 1306 can be a processor that controls one or more portions of system 1300, and/or a processor that analyzes information received by receiver 1302, generates information for transmission by a transmitter 1314, and controls one or more portions of system 1300. System 1300 can include an optimization component 1308 that coordinates beam assignments. Optimization component 1308 may be incorporated into the processor 1306. It is to be appreciated that optimization component 1308 can include optimization code that performs utility based analysis in connection with assigning user devices to beams. The optimization code can utilize artificial intelligence based methods in connection with performing inference and/or probabilistic determinations and/or statistical-based determination in connection with optimizing user device beam assignments.

System (user device) 1300 can additionally comprise memory 1310 that is operatively coupled to processor 1306 and that stores information related to beam pattern information, lookup tables comprising information related thereto, and any other suitable information related to beam-forming as described herein. Memory 1310 can additionally store protocols associated with generating lookup tables, etc., such that system 1300 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1310 of the subject systems and methods is intended to comprise, without being limited to, these and any other suitable types of memory. The processor 1306 is connected to a symbol modulator 1312 and transmitter 1314 that transmits the modulated signal.

Figure 14:
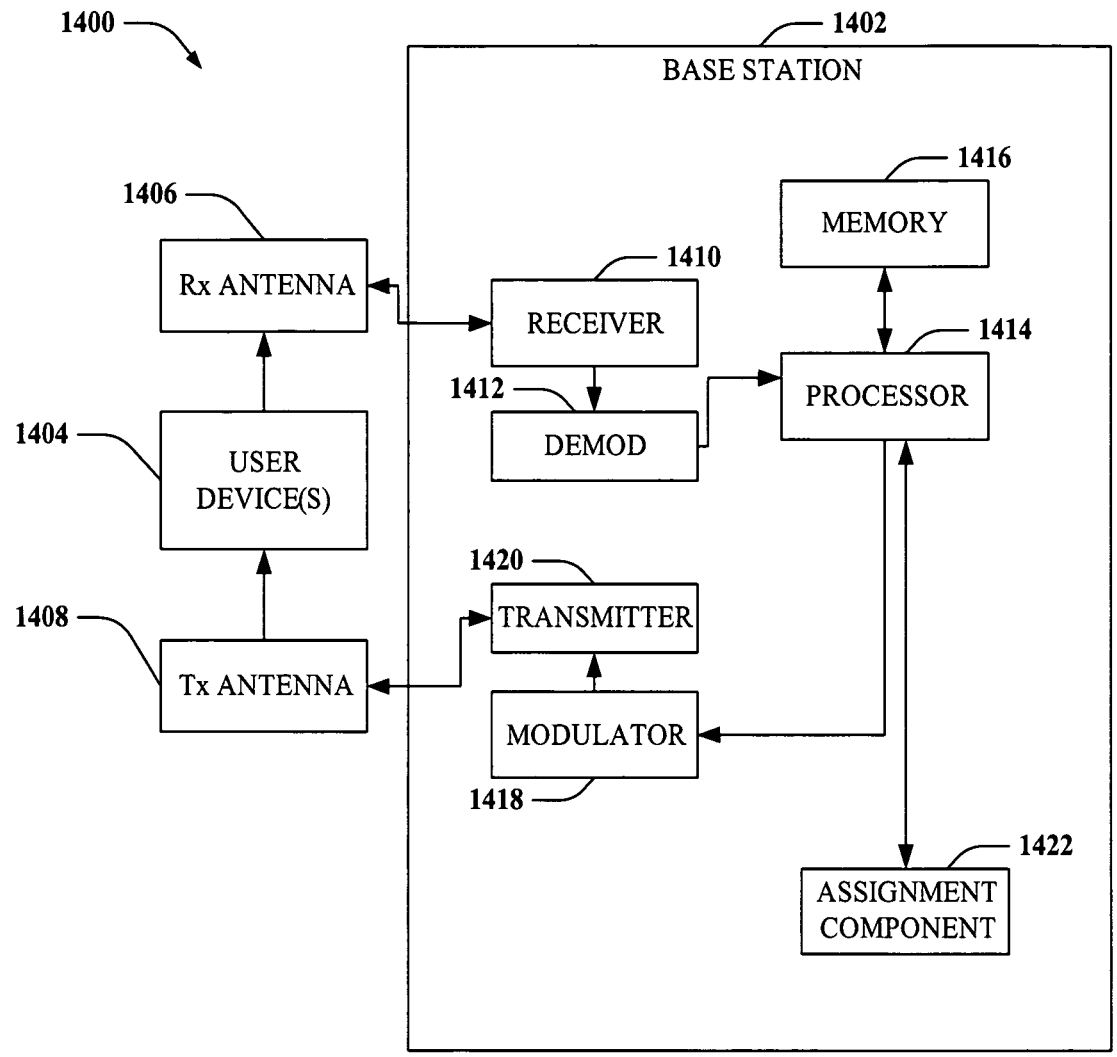
FIG. 14 is an illustration of a system that utilizes beamforming to increase system capacity in a wireless communications environment.

FIG. 14 illustrates a system that utilizes SDMA to increase system capacity in a wireless communication environment. System 1400 comprises a base station 1402 with a receiver 1410 that receives signal(s) from one or more user devices 1404 via one or more receive antennas 1406, and transmits to the one or more user devices 1404 through a plurality of transmit antennas 1408. In one example, receive antennas 1406 and transmit antennas 1408 can be implemented using a single set of antennas. Receiver 1410 can receive information from receive antennas 1406 and is operatively associated with a demodulator 1412 that demodulates received information. Receiver 1410 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1414 that is similar to the processor described above with regard to FIG. 13, and is coupled to a memory 1416 that stores information related to user device assignments, lookup tables related thereto and the like. Receiver output for each antenna can be jointly processed by receiver 1410 and/or processor 1414. A modulator 1418 can multiplex the signal for transmission by a transmitter 1420 through transmit antennas 1408 to user devices 1404.

Base station 1402 further comprises an assignment component 1422, which can be a processor distinct from or integral to processor 1414, and which can evaluate a pool of all user devices in a sector served by base station 1404 and can assign user devices to beams based at least in part upon the location of the individual user devices.

Figure 15:
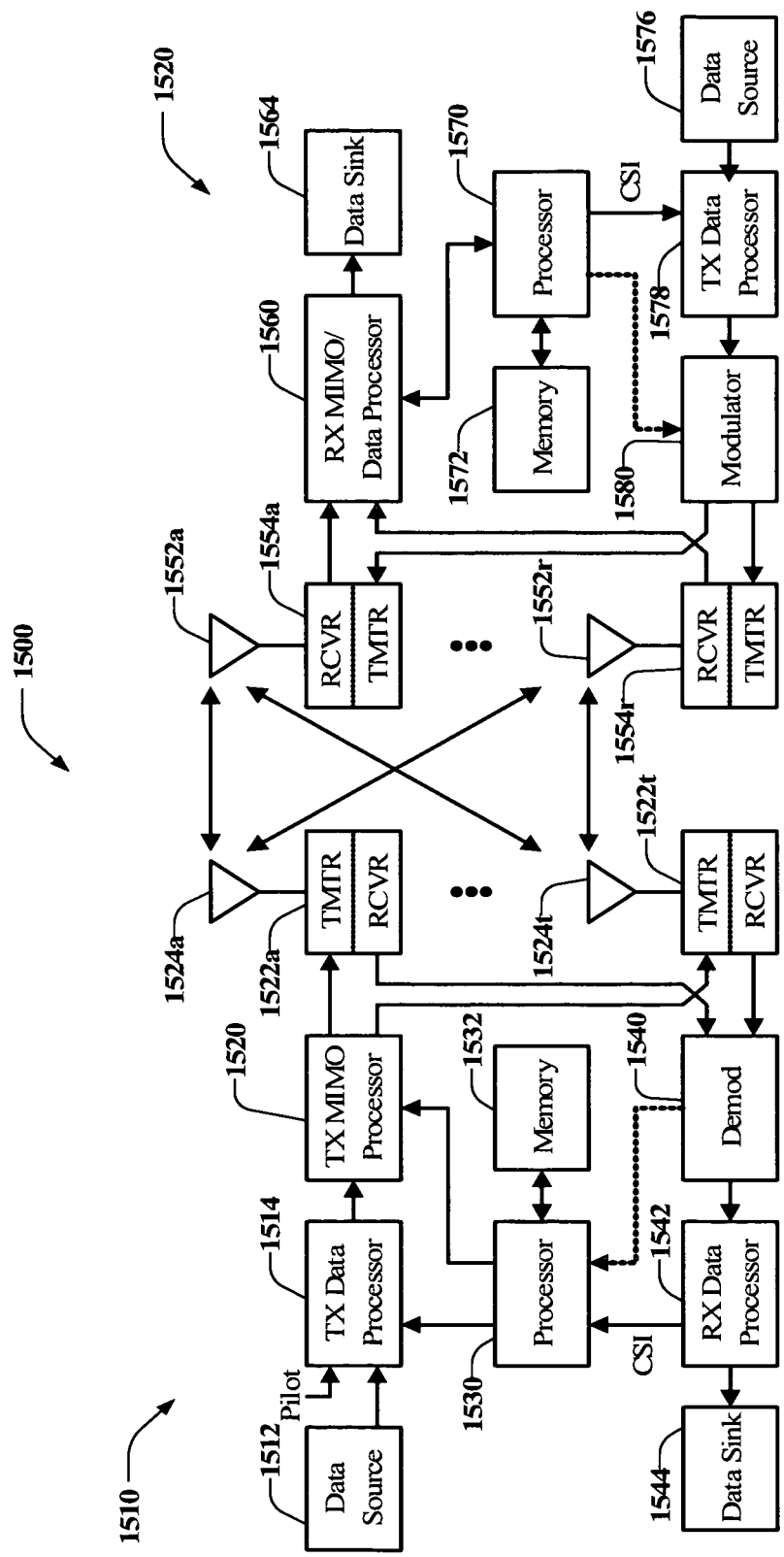
FIG. 15 is an illustration of a wireless communication environment that can be employed in conjunction with the various systems and methods described herein.

FIG. 15 illustrates a transmitter and receiver in a multiple access wireless communication system 1500. The wireless communication system 1500 depicts one base station and one user device for sake of brevity; however, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein to facilitate wireless communication there between.

At transmitter system 1510 traffic data for a number of data streams is provided from a data source 1512 to a transmit (TX) data processor 1514. In one example, each data stream can be transmitted over a respective transmit antenna. TX data processor 1514 formats, codes, and interleaves the traffic data for each data stream based on a particular coding scheme selected for that data stream to provide coded data. For instance, TX data processor 1514 can apply beam-forming weights to the symbols of the data streams based upon the user to which the symbols are being transmitted and the antenna from which the symbol is being transmitted. In some embodiments, the beam-forming weights may be generated based upon channel response information that is indicative of the condition of the transmission paths between the access point and the access terminal. The channel response information may be generated utilizing CQI information or channel estimates provided by the user. Further, in those cases of scheduled transmissions, the TX data processor 1514 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by processor 1530. In some embodiments, the number of parallel spatial streams may be varied according to the rank information that is transmitted from the user.

The modulation symbols for the data streams are provided to a TX MIMO processor 1520, which may further process the modulation symbols (e.g., for OFDM). TX MIMO processor 1520 provides $N_T$ symbol streams to $N_T$ transmitters (TMTR) 1522a through 1522t. For instance, TX MIMO processor 1520 can apply beam-forming weights to the symbols of the data streams based upon the user to which the symbols are being transmitted and the antenna from which the symbol is being transmitted from that user's channel response information.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1522a through 1522t are transmitted from $N_T$ antennas 1524a through 1524t, respectively.

At receiver system 1550, the transmitted modulated signals are received by $N_R$ antennas 1552a through 1552r and the received signal from each antenna 1552 is provided to a respective receiver (RCVR) 1554. Each receiver 1554 conditions (e.g., filters, amplifies, and downconverts) a respective received signal, digitizes the conditioned signal to provide samples, and further processes the samples to provide a corresponding "received" symbol stream.

An RX data processor 1560 then receives and processes the $N_R$ received symbol streams from $N_R$ receivers 1554 based on a particular receiver processing technique to provide the rank number of "detected" symbol streams. The processing by RX data processor 1560 is described in further detail below. Each detected symbol stream includes symbols that are estimates of the modulation symbols transmitted for the corresponding data stream. RX data processor 1560 then demodulates, deinterleaves, and decodes each detected symbol stream to recover the traffic data for the data stream. The processing by RX data processor 1560 is complementary to that performed by TX MIMO processor 1520 and TX data processor 1514 at transmitter system 1510.

The channel response estimate generated by RX processor 1560 may be used to perform space, space/time processing at the receiver, adjust power levels, change modulation rates or schemes, or other actions. RX processor 1560 may further estimate the signal-to-noise-and-interference ratios (SNRs) of the detected symbol streams, and possibly other channel characteristics, and provides these quantities to a processor 1570. RX data processor 1560 or processor 1570 may further derive an estimate of the "effective" SNR for the system. Processor 1570 then provides estimated channel information (CSI), which may comprise various types of information regarding the communication link and/or the received data stream. For example, the CSI may comprise only the operating SNR. The CSI is then processed by a TX data processor 1538, which also receives traffic data for a number of data streams from a data source 1576, modulated by a modulator 1580, conditioned by transmitters 1554a through 1554r, and transmitted back to transmitter system 1510.

At transmitter system 1510, the modulated signals from receiver system 1550 are received by antennas 1524, conditioned by receivers 1522, demodulated by a demodulator 1540, and processed by a RX data processor 1542 to recover the CSI reported by the receiver system. The reported CSI is then provided to processor 1530 and used to (1) determine the data rates and coding and modulation schemes to be used for the data streams and (2) generate various controls for TX data processor 1514 and TX MIMO processor 1520.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the Ns independent channels may also be referred to as a spatial subchannel (or a transmission channel) of the MIMO channel and corresponds to a dimension.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

It is to be understood that the embodiments described herein may be implemented by hardware, software, firmware, middleware, microcode, or any combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for allocating resources in a wireless communications environment, comprising:
   receiving a mapping between a first hop-port and frequency range, the mapping associated with a first channel tree that includes multiple mappings between hop-ports and frequency ranges, the first channel tree further includes the first hop-port; and
   determining whether to assign a second access terminal to a second hop-port that is mapped to at least the same frequency range during a substantially similar instance in time, the determination made as a function of characteristics relating to a first access terminal associated with the first hop-port, wherein a second channel tree includes multiple mappings between hop-ports and frequency ranges, the second channel tree further includes the second hop-port, wherein upon determining that the first access terminal is a candidate for employing Space-Division Multiple Access (SDMA),
mapping the second-hop port and associating the second access terminal with the second hop-port when the second access terminal is also a candidate for employing SDMA.

2. The method of claim 1, further comprising:
determining that the first access terminal is not a candidate for employing SDMA; and
preventing mapping of the second-hop port.

3. The method of claim 1, wherein the first channel tree includes multiple mappings between hop-ports and frequency ranges according to a first hop permutation and the second channel tree includes multiple mappings between hop-ports and the frequency ranges according to the first hop permutation.

4. The method of claim 3, further comprising:
determining that the first access terminal has a first spatial direction;
determining that a second access terminal has a second spatial direction;
mapping the first access terminal to the first hop-port for a first time period; and
mapping the second access terminal to the second hop-port for the first time period.

5. The method of claim 4, further comprising:
associating the first access terminal with a first plurality of hop-ports in the first channel tree; and
preventing association of a third access terminal to the first plurality of hop-ports in the second channel tree.

6. The method of claim 5, further comprising determining that the third access terminal is operating in a diversity mode, and wherein preventing comprises preventing associating when the third access terminal is operating in the diversity mode.

7. The method of claim 5, wherein each hop port is mapped to a range of frequencies, the method further comprising:
randomly mapping the first plurality of hop-ports to frequencies within the range of frequencies; and
randomly mapping the second plurality of hop-ports to frequencies within the range of frequencies.

8. The method of claim 4, further comprising:
receiving a quantized value indicative of the first direction from the first access terminal; and
associating the first access terminal to the first hop-port based upon the quantized value.

9. The method of claim 8, wherein the quantized value is selected from a codebook.

10. The method of claim 1, further comprising receiving channel information from the first access terminal and wherein determining comprises determining based upon the channel information.

11. The method of claim 10, wherein the channel information comprises a Channel Quality Indicator.

12. A wireless communications apparatus, comprising:
a memory that includes information relating to whether a first and a second access terminals are candidates for employing Space-Division Multiple Access (SDMA) in at least one of an Orthogonal Frequency Division Multiplexing (OFDM) or orthogonal frequency division multiple access (OFDMA) environment and includes a mapping between a first hop-port and frequency range, wherein the memory further includes a first channel tree includes multiple mappings between hop-ports and frequency ranges, the first channel tree further includes the first hop-port, and a second channel tree includes multiple mappings between hop-ports and frequency ranges, the second channel tree further includes a second hop-port; and
a processor that determines whether to assign the second access terminal to the second hop-port that is mapped to the frequency range during a similar instance in time, the determination made as a function of characteristics relating to the first access terminal, wherein the first access terminal is associated with the first hop-port, wherein
upon determining that the first access terminal is a candidate for employing SDMA,
mapping the second-hop port and associating the second access terminal with the second hop-port when the second access terminal is also a candidate for employing SDMA.

13. The wireless communications apparatus of claim 12, the processor performs the mapping for a forward-link.

14. The wireless communications apparatus of claim 12, the processor receives packets from the first and second access terminals and determines whether the access terminals are candidates for employing SDMA on a per-packet basis.

15. The wireless communications apparatus of claim 12, the processor is associated with multiple transmit antennas that are employed to effectuate communications between an access point and the access terminals.

16. An apparatus for managing frequency resources in a wireless communications environment, comprising:
means for determining that a first access terminal and a second access terminal are candidates for employing Space-Division Multiple Access (SDMA), wherein the means employs a first channel tree includes multiple mappings between hop-ports and frequency ranges, the first channel tree further includes a first hop-port, and a second channel tree includes multiple mappings between hop-ports and frequency ranges, the second channel tree further includes a second hop-port; and
means for assigning the first access terminal to the first hop-port, wherein the means for assigning assigns the second access terminal to the second hop-port upon determining that the first access terminal is a candidate for employing SDMA and the second access terminal is also a candidate for employing SDMA, the first and second hop-ports are mapped to substantially similar time-frequency resources.

17. The apparatus of claim 16, further comprising:
means for analyzing the first channel tree that includes the mapping between the first hop-port and the time-frequency resources; and
means for defining the mapping between the second hop-port and the time-frequency resources in the second channel tree.

18. The apparatus of claim 16, further comprising:
means for maintaining a codebook, the codebook includes information relating to a quantized value indicative of a first spatial direction associated with the first access terminal; and
means for defining mappings associated with the first channel tree and the second channel tree as a function of the quantized value.

19. The apparatus of claim 16, further comprising:
means for determining that a third access terminal is not a candidate for employing SDMA; and
means for ensuring that the third access terminal does not share time-frequency resources with other access terminals.

20. The apparatus of claim 16, further comprising:
means for mapping a first plurality of hop-ports to a set of frequencies within a range of frequencies; and
means for mapping a second plurality of hop-ports to the set of frequencies within the range of frequencies so that a hop-port within the first plurality of hop-ports and a corresponding hop-port within the second plurality of hop-ports are mapped to corresponding frequencies within the set of frequencies.

21. The apparatus of claim 16, further comprising:
means for randomly mapping a first plurality of hop-ports to a set of frequencies within a range of frequencies; and
means for randomly mapping a second plurality of hop-ports corresponding to the first set of hop-ports to the set of frequencies within the range of frequencies so that corresponding hop-ports within the first set of hop-ports and the second set of hop-ports are not mapped to substantially similar frequencies.

22. A computer-readable storage medium having stored thereon computer-executable instructions for:
determining whether a first access terminal is a candidate for employing Space-Division Multiple Access (SDMA);
assigning the first access terminal to one or more first hop-ports that are mapped to one or more frequency tones in a first channel tree, wherein the first channel tree includes multiple mappings between hop-ports and frequency ranges, the first channel tree further includes the one or more first hop-ports;
determining whether a second access terminal is a candidate for employing SDMA;
assigning the second access terminal to one or more hop-ports based upon characteristics of the first access terminal, wherein upon a determination that the first access terminal and the second access terminal are candidates for employing SDMA, the second access terminal is assigned to the one or more hop-ports; and
mapping the one or more hop-ports assigned to the second access terminal in a second channel tree to the one or more frequency tones mapped to the one or more hop-ports assigned to the first access terminal, wherein the second channel tree includes multiple mappings between hop-ports and frequency ranges, the second channel tree further includes the one or more hop-ports assigned to the second access terminal.

23. The computer-readable storage medium of claim 22, further comprising instructions for determining that the first access terminal is separated in space a sufficient distance from the second access terminal to enable the first access terminal and the second access terminal to share time-frequency resources.

24. The computer-readable storage medium of claim 22, further comprising instructions for:
determining that a third access terminal is not a candidate for employing SDMA;
assigning the third access terminal to one or more hop-ports within the first channel tree; and
ensuring that hop-ports within the second channel tree that correspond to hop-ports within the first channel tree associated with the third access terminal are not assigned to a disparate access terminal.

25. The computer-readable storage medium of claim 24, further comprising instructions for:
randomly mapping the one or more hop-ports associated with the first access terminal to the one or more frequency tones; and
randomly mapping the one or more hop-ports associated with the second access terminal to the one or more frequency tones.

26. A processor that executes instructions for enhancing performance for a wireless communication environment, the instructions comprising:
associating a first access terminal to a first set of hop-ports, the first access terminal configured to operate in an at least one of an Orthogonal Frequency Division Multiplexing (OFDM) or orthogonal frequency division multiple access (OFDMA) environment;
mapping the first set of hop-ports to a range of frequencies in a first channel tree that includes multiple mappings between hop-ports and frequency ranges;
mapping the second set of hop-ports to the range of frequencies in a second channel tree that includes multiple mappings between hop-ports and frequency ranges so that the first set of hop-ports and the second set of hop-ports are mapped to the range of frequencies at a substantially similar time;
determining whether the first access terminal is a candidate for employment of Space-Division Multiple Access (SDMA); and
determining whether to assign the second access terminal to the second hop-ports, wherein the determination is a function of characteristics relating to the first access terminal associated with the first set of hop-port, wherein upon determining that the first access terminal is a candidate for employing SDMA, associating the second access terminal with the second hop-port when the second access terminal is also a candidate for employing SDMA.

27. The processor of claim 26, the instructions further comprise ensuring that the first and second access terminal are separated in space a threshold distance.

28. A method for allocating resources in a wireless communications environment, comprising:
receiving a mapping between a first hop-port and frequency range; and
determining whether to assign a second access terminal to a second hop-port that is mapped to at least the same frequency range during a substantially similar instance in time, the determination made as a function of characteristics relating to a first access terminal associated with the first hop-port;
determining that the first access terminal has a first spatial direction;
determining that a second access terminal has a second spatial direction;
mapping the first access terminal to the first hop-port for a first time period; and
mapping the second access terminal to the second hop-port for the first time period,
wherein a first channel tree includes multiple mappings between hop-ports and frequency ranges according to a first hop permutation and a second channel tree includes multiple mappings between hop-ports and the frequency ranges according to the first hop permutation.

29. The method of claim 28, further comprising:
associating the first access terminal with a first plurality of hop-ports in the first channel tree; and
preventing association of a third access terminal to the first plurality of hop-ports in the second channel tree.

30. The method of claim 29, further comprising determining that the third access terminal is operating in a diversity mode, and wherein preventing comprises preventing associating when the third access terminal is operating in the diversity mode.

31. The method of claim 29, wherein each hop port is mapped to a range of frequencies, the method further comprising:
  randomly mapping the first plurality of hop-ports to frequencies within the range of frequencies; and
  randomly mapping the second plurality of hop-ports to frequencies within the range of frequencies.

32. The method of claim 28, further comprising:
  receiving a quantized value indicative of the first direction from the first access terminal; and
  associating the first access terminal to the first hop-port based upon the quantized value.

33. The method of claim 32, wherein the quantized value is selected from a codebook.

* * * * *